United States Patent
Kato

(10) Patent No.: US 12,248,132 B2
(45) Date of Patent: Mar. 11, 2025

(54) IMAGE CAPTURING APPARATUS AND IMAGE CAPTURING METHOD

(71) Applicant: SCREEN HOLDINGS CO., LTD., Kyoto (JP)

(72) Inventor: Keisuke Kato, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 118 days.

(21) Appl. No.: 18/077,675

(22) Filed: Dec. 8, 2022

(65) Prior Publication Data

US 2023/0273419 A1  Aug. 31, 2023

(30) Foreign Application Priority Data

Feb. 25, 2022 (JP) ................................. 2022-028234

(51) Int. Cl.
  *G02B 21/00* (2006.01)
  *H04N 23/56* (2023.01)
  *H04N 23/60* (2023.01)

(52) U.S. Cl.
  CPC ..... *G02B 21/0052* (2013.01); *G02B 21/0036* (2013.01); *H04N 23/56* (2023.01); *H04N 23/60* (2023.01)

(58) Field of Classification Search
  CPC .... H04N 23/56; H04N 23/60; G02B 21/0036; G02B 21/0052; G02B 21/06; G02B 21/367

(Continued)

(56) References Cited

U.S. PATENT DOCUMENTS 6,711,283 B1    3/2004  Soenksen
10,298,833 B2 * 5/2019  Oishi ................. G02B 7/343

(Continued)

FOREIGN PATENT DOCUMENTS

JP       2019-056917 A      4/2019

OTHER PUBLICATIONS

S. Abrahamsson et al., "MultiFocus Polarization Microscope (MF-PolScope) for 3D polarization imaging of up to 25 focal planes simultaneously", Optics Express, vol. 23, No. 6, Mar. 17, 2015, pp. 7734-7754.

(Continued)

*Primary Examiner* — William C Vaughn, Jr.
*Assistant Examiner* — Astewaye Gettu Zewede
(74) *Attorney, Agent, or Firm* — Rimon P.C.

(57) ABSTRACT

An image capturing apparatus includes a stage on which an object is placed, an image capturer, and a controller that relatively moves the stage within a predetermined plane with respect to the image capturer to move a unit image capturing region, and simultaneously causes the image capturer to perform image capturing a plurality of times. The image capturer includes a light source, an objective lens having an optical axis in a direction intersecting the predetermined plane, a multifocal diffractor that generates a plurality of rays of diffracted light including a ray of diffracted light of 0 order from incident light entering through the objective lens, the plurality of rays of diffracted light having focusing positions being different from each other, and an image capturing member that receives each of the plurality of rays of diffracted light in each of a plurality of segment regions defined in a light receiving surface.

6 Claims, 16 Drawing Sheets

(58) Field of Classification Search
USPC .......................................................... 348/79
See application file for complete search history.

(56) References Cited

U.S. PATENT DOCUMENTS

| | | | | |
|---|---|---|---|---|
| 11,409,092 | B2* | 8/2022 | Lv .......................... | H04N 23/56 |
| 11,921,277 | B2* | 3/2024 | Takimoto ............... | G02B 21/24 |
| 2021/0293723 | A1* | 9/2021 | Ohno .................. | G01N 15/1434 |
| 2023/0152563 | A1* | 5/2023 | Ueda ...................... | G03B 15/05 |
| | | | | 359/391 |

OTHER PUBLICATIONS

Z. Yang et al., "Single-Shot Smartphone-Based Quantitative Phase Imaging Using a Distorted Grating", PLOS One, Research Article, Jul. 21, 2016, pp. 1-10.

* cited by examiner

FIG. 4
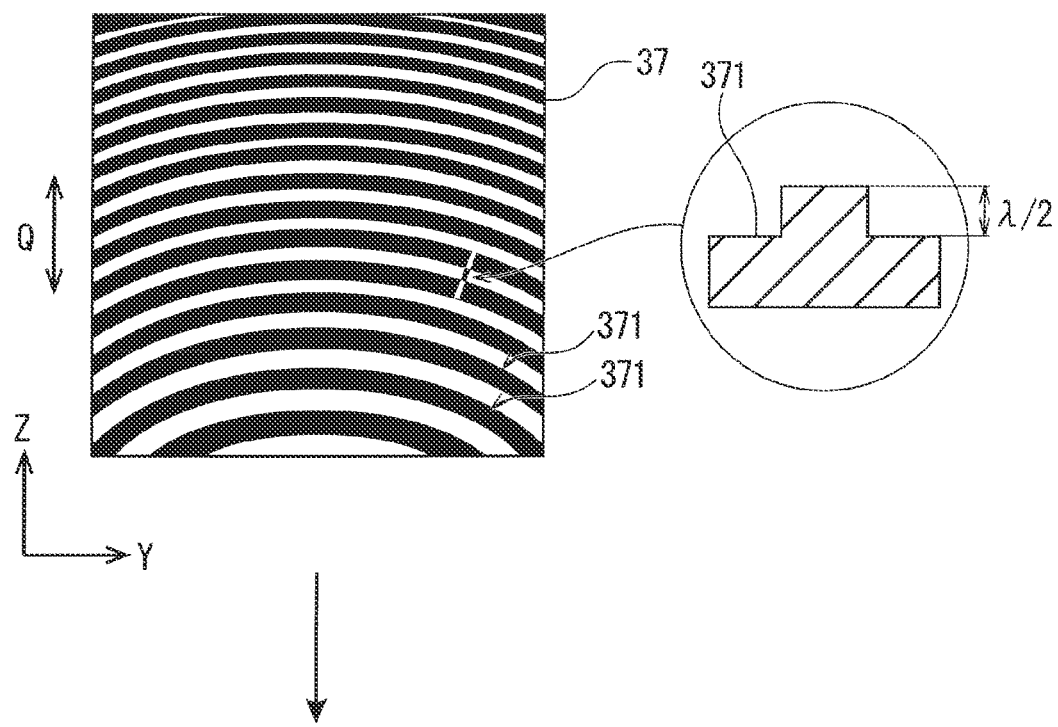
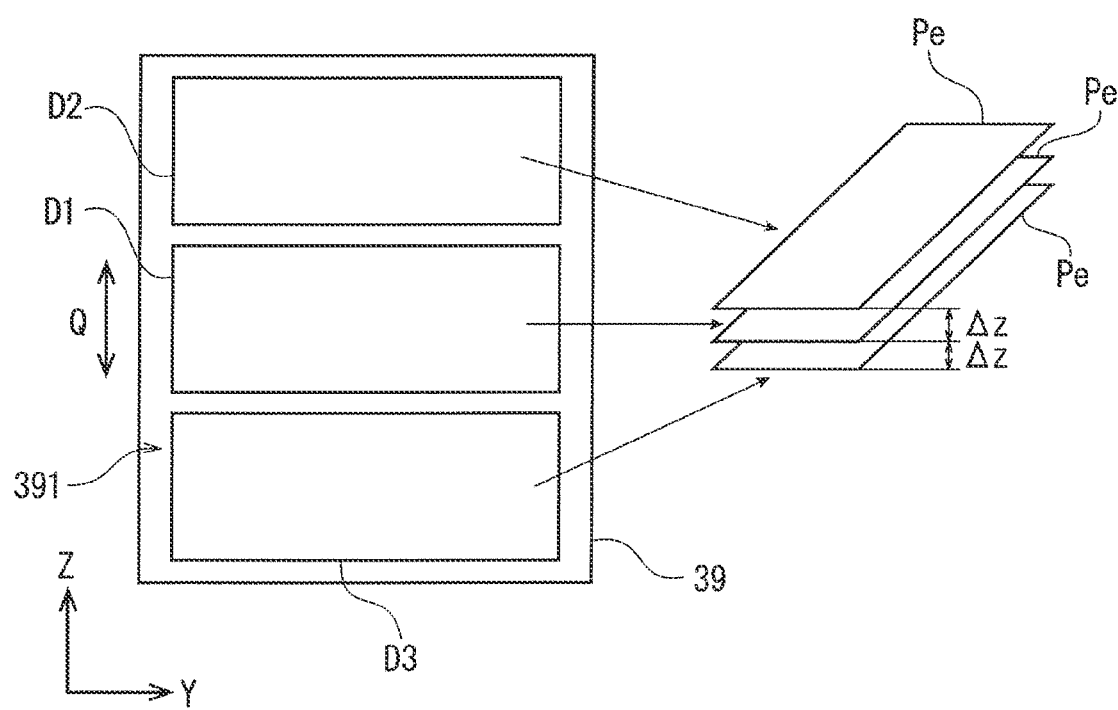

IMAGE CAPTURING APPARATUS AND IMAGE CAPTURING METHOD

BACKGROUND OF THE INVENTION

Field of the Invention

The present disclosure relates to an image capturing apparatus and an image capturing method.

Description of the Background Art

Various types of samples, such as cells, have hitherto been observed using a microscope, and its observation images (microscopic images) have been captured. In this case, an image capturing region (hereinafter also referred to as a "unit image capturing region") of the captured image obtained in a single image capturing is a region corresponding to the field of view of the microscope. As the magnification (magnification power) of the microscope is higher, the unit image capturing region is narrower. Accordingly, when a wide region is to be captured, the magnification power needs to be lowered.

In order to obtain a captured image of a sufficiently wide region with a sufficiently high magnification power, for example, in Japanese Patent Application Laid-Open No. 2019-56917, a stage on which a sample is placed is moved within an XY plane, and simultaneously image capturing is performed a plurality of times. Each captured image acquired in each image capturing is an image capturing an adjacent region in a sample, thus when these captured images are aligned and connected together in the X direction and the Y direction, a captured image (hereinafter also referred to as a "wide captured image") of a region wider than the unit image capturing region can be obtained.

Further, there are documents as follows.

Abrahamsson, S., McQuilken, M., Mehta, S. B., Verma, A., Larsch, J., Ilic. R., Heintzmann, R., Bargmann. C. I., Gladfelter, A. S. and Oldenbourg, R. (2015). "MultiFocus Polarization Microscope (MF-PolScope) for 3D polarization imaging of up to 25 focal planes simultaneously". *Optics Express,* 23(6): 7734-7754.

Zhenyu Yang, Qiwen Zhan. "Single-Shot Smartphone-Based Quantitative Phase Imaging Using a Distorted Grating". *PLOS ONE.* 2016: 11(7).

As described above, in the technology described in Japanese Patent Application Laid-Open No. 2019-56917, a stage on which a sample is placed is moved within an XY plane, and simultaneously image capturing is performed a plurality of times. In this case, when it is arranged that a Z position of an objective lens is automatically adjusted so that a surface of the sample is focused on, for example, at the timing when each image capturing is performed (what is called autofocus), and the captured images acquired in each image capturing are aligned and connected together in the X direction and the Y direction, one wide captured image focusing on the surface of the sample can be obtained.

Incidentally, in recent years, there is an increasing need for observation of a three-dimensional sample, such as a three-dimensionally cultured sample such as spheroids, and a sample cultured in suspension culture. In order to sufficiently observe a whole image of such a three-dimensional sample, merely obtaining one wide captured image focused on a specific surface (for example, a surface of the sample) is insufficient.

In order to sufficiently observe a whole image of a three-dimensional sample, for example, it is effective to acquire wide captured images being cross-sections of the three-dimensional sample taken along the XY plane at a plurality of positions (z1, z2, . . . ) different from each other in the Z direction. However, to implement this, operation of acquiring a wide captured image needs to be repeatedly performed again and again as follows: at one focusing position (z1), the stage is moved within the XY plane and simultaneously image capturing is performed a plurality of times so as to acquire a first wide captured image, and subsequently at another focusing position (z2), the stage is again moved within the XY plane and simultaneously image capturing is performed a plurality of times so as to acquire a second wide captured image. In other words, in order to acquire wide captured images at n cross-sections, the operation of moving the stage within the XY plane and simultaneously performing image capturing a plurality of times needs to be performed n times. This requires considerable time.

SUMMARY

The present disclosure is intended for an image capturing apparatus.

In one aspect of the present disclosure, an image capturing apparatus includes a stage on which an object is placed, an image capturer, and a controller that relatively moves the stage within a predetermined plane with respect to the image capturer to move a unit image capturing region captured in the image capturer, and simultaneously causes the image capturer to perform image capturing a plurality of times. The image capturer includes a light source that emits illumination light, an objective lens having an optical axis in a direction intersecting the predetermined plane, a multifocal diffractor that generates a plurality of rays of diffracted light including a ray of diffracted light of 0 order from incident light entering through the objective lens, the plurality of rays of diffracted light having focusing positions being different from each other, and an image capturing member that receives each of the plurality of rays of diffracted light in each of a plurality of segment regions defined in a light receiving surface.

The unit image capturing region is moved and the image capturer is simultaneously caused to perform image capturing a plurality of times, and thus when the captured images (unit captured images) each of them is acquired in each image capturing are connected together, a captured image (wide captured image) of a region wider than the unit image capturing region can be obtained. Here, in the image capturer, the plurality of rays of diffracted light having the focusing positions being different from each other are generated in the multifocal diffractor, and each ray of diffracted light is received in each of the plurality of segment regions defined in the light receiving surface of the image capturing member. With this, in the image capturer, in a single image capturing, a plurality of unit captured images capturing the same unit image capturing region with the focusing positions being different from each other are acquired. Thus, each time a single operation of acquiring the wide captured image is performed, a plurality of wide captured images having the focusing positions being different from each other are acquired. Therefore, such a plurality of wide captured images having the focusing positions being different from each other can be efficiently acquired.

Preferably, the controller alternately performs a primary scanning operation of moving the unit image capturing region in a primary scanning direction and a secondary scanning operation of moving the unit image capturing region in a secondary scanning direction intersecting the primary scanning direction to move the unit image capturing region in an entire predetermined region, and causes the image capturer to perform the image capturing of the plurality of times in parallel with the primary scanning operation, and the unit image capturing region is an elongated region extending in the secondary scanning direction.

When the unit image capturing region is set as an elongated region extending in the secondary scanning direction, the number of primary scanning operations necessary for the unit image capturing region to move through the entire predetermined region can be reduced. As a result, time necessary for the unit image capturing region to move through the entire predetermined region (that is, time required for the operation of acquiring the wide captured image in the predetermined region) is less liable to increase.

Preferably, the light receiving surface is segmented with dividing lines in parallel with each other, and the plurality of segment regions are thereby defined.

Each segment region extends across the entire light receiving surface in one direction, and thus the unit image capturing region can be set as an elongated region having a sufficient length in one direction. Thus, for example, by arranging the extending direction of the unit image capturing region to match the secondary scanning direction, the number of primary scanning operations necessary for the unit image capturing region to move through the entire predetermined region can be reduced.

Preferably, the light receiving surface is segmented with grid-like dividing lines, and the plurality of segment regions are thereby defined.

The number of segment regions defined in the light receiving surface can be set to a sufficiently large number. Therefore, the number of unit captured images acquired in a single image capturing, or the number of wide captured images acquired each time a single operation of acquiring the wide captured image is performed, becomes sufficiently large. With this, a plurality of wide captured images can be efficiently acquired especially.

Preferably, the controller performs a plurality of times of an operation of moving the unit image capturing region in an entire predetermined region and simultaneously causing the image capturer to perform the image capturing of the plurality of times, with an operation of relatively moving the objective lens along the optical axis with respect to the stage being inserted between each of the plurality of times of the operation.

Provided that, for example, N wide captured images with the focusing positions being different from each other are acquired each time a single operation of acquiring the wide captured image in the predetermined region is performed, when the operation is performed M times, for example, (M×N) wide captured images with the focusing positions being different from each other can be acquired.

The present disclosure is also intended for an image capturing method.

In one aspect of the present disclosure, an image capturing method includes a repeated image capturing step of relatively moving a stage on which an object is placed within a predetermined plane with respect to an image capturer to move a unit image capturing region captured in the image capturer, and simultaneously causing the image capturer to perform image capturing a plurality of times. In each of the image capturing of the plurality of times performed in the image capturer, illumination light is emitted from a light source, a plurality of rays of diffracted light including a ray of diffracted light of 0 order are generated from incident light entering a multifocal diffractor through an objective lens having an optical axis in a direction intersecting the predetermined plane, the plurality of rays of diffracted light having focusing positions being different from each other, and each of the plurality of rays of diffracted light is received in each of a plurality of segment regions defined in a light receiving surface of an image capturing member.

A plurality of wide captured images with focusing positions being different from each other can be efficiently acquired.

In view of the above, the present disclosure has an object to provide a technology that enables efficient acquisition of a plurality of wide captured images with focusing positions being different from each other.

These and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 4 is a schematic diagram for illustrating a diffractor and a light receiving surface that receives diffracted light diffracted by the diffractor.

DESCRIPTION OF THE PREFERRED EMBODIMENTS

Figure 1:
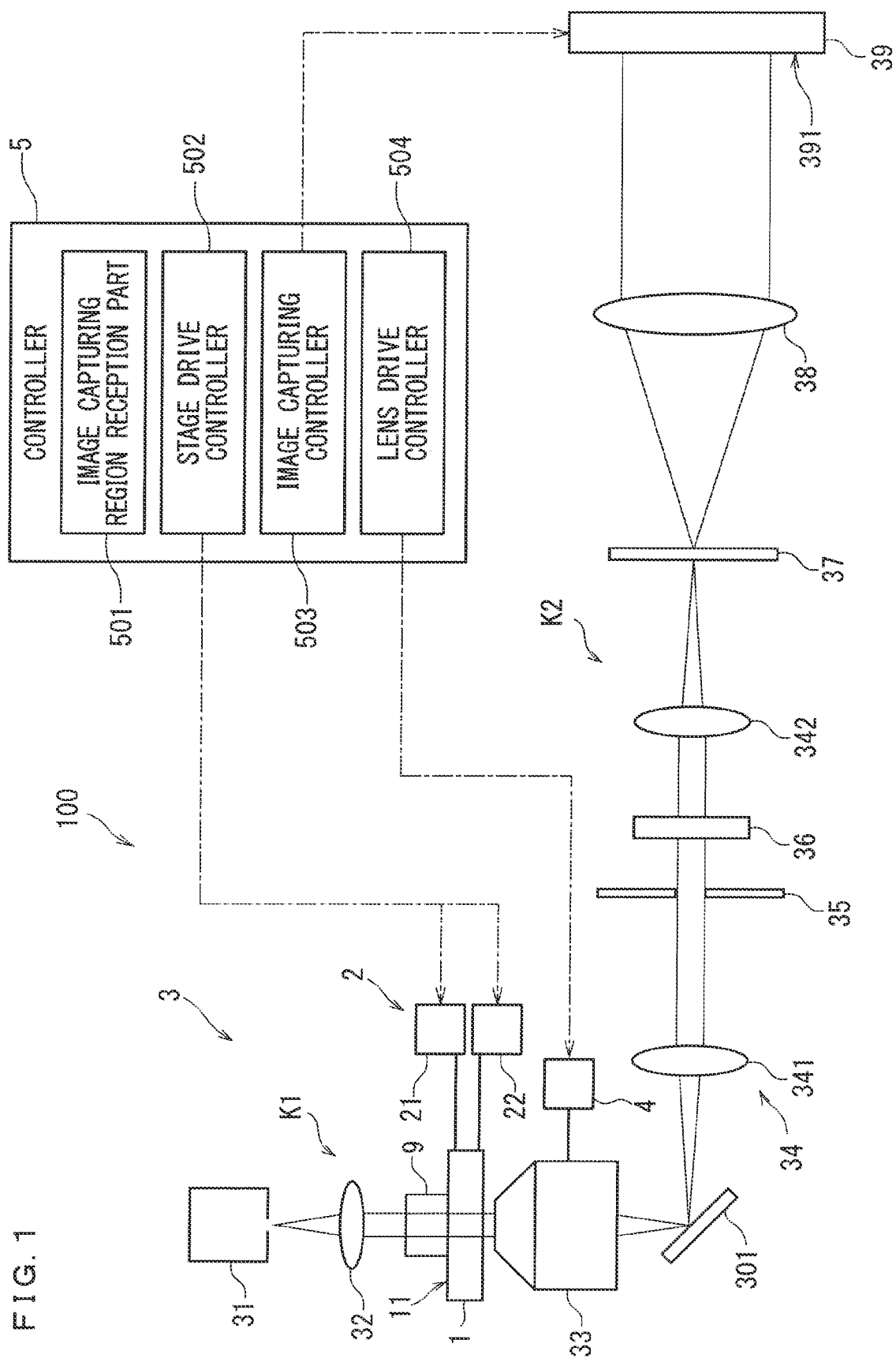
FIG. 1 is a diagram schematically illustrating a configuration of an image capturing apparatus.

An embodiment will be described below with reference to the accompanying drawings. Note that constituent elements described in the present embodiment are merely examples, and are not intended to limit the scope of the present disclosure only to the constituent elements described. Further, in the drawings, for the sake of better understanding, the dimensions or the number of each part may be illustrated in an exaggerated or simplified manner as necessary.

Unless otherwise noted, expressions representing relative or absolute positional relationships (for example, "in a direction". "along a direction", "parallel", "perpendicular". "central", "concentric", "coaxial", and the like) not merely precisely represent the positional relationships but also represent states as a result of being displaced relatively or with regard to an angle or a distance insofar as tolerances or similar functions are achieved. Further, unless otherwise noted, expressions representing equal states (for example, "identical", "equal", "homogeneous", and the like) not merely quantitatively precisely represent equal states but also represent states including differences with which tolerances or similar functions are achieved. Further, unless otherwise noted, expressions representing shapes (for example, "circle", "quadrangle", "cylinder", and the like) not merely geometrically precisely represent the shapes but also represent shapes insofar as similar effects can be achieved, and the shapes may include, for example, a roughened portion, a chamfered portion, and the like. Further, expressions, such as "to be provided with", "to be equipped with", "to comprise", "to include", and "to have" a constituent element, are not exclusive expressions that exclude presence of other constituent elements. Further, an expression "at least one of A. B, and C" includes "only A", "only B", "only C", "any two of A, B, and C", and "all of A, B, and C".

1. Overall Configuration of Image Capturing Apparatus

A configuration of an image capturing apparatus 100 according to an embodiment will be described with reference to FIG. 1. FIG. 1 is a diagram schematically illustrating the configuration of the image capturing apparatus 100.

The image capturing apparatus 100 is an apparatus that captures microscopic images of an object 9, and includes a stage 1, a stage driving part 2, an image capturer 3, a lens driving part 4, and a controller 5.
(Stage 1)

The stage 1 is a placement part on which the object 9 as a target of image capturing is placed, and includes a flat placement surface 11 on which the object 9 is placed. The stage 1 is made of a transparent material that allows transmission of illumination light to be described later.

The object 9 as a target of image capturing may be any object. Examples of the object 9 may include a three-dimensional sample, such as three-dimensionally cultured cells such as spheroids, and cells cultured in suspension culture. Further, the object 9 may be placed on the placement surface 11 of the stage 1 in a state of being retained in a portable plate, a culture vessel, or the like (as an example, a microwell plate).
(Stage Driving Part 2)

The stage driving part (the stage driver) 2 relatively moves the stage 1 (or the object 9 placed on the stage 1) within a plane in parallel with the placement surface 11 (that is, a plane perpendicular to the optical axis of an objective lens 33 to be described later) with respect to the image capturer 3, and thereby moves a region (unit image capturing region) E being a target of image capturing in the image capturer 3 (see FIG. 9).

Specifically, for example, the stage driving part 2 includes a primary scanning mechanism 21 and a secondary scanning mechanism 22. The primary scanning mechanism 21 moves the stage 1 in a first direction (hereinafter referred to as a "primary scanning direction") defined within the plane in parallel with the placement surface 11. The secondary scanning mechanism 22 moves the stage 1 in a second direction (hereinafter referred to as a "secondary scanning direction") perpendicular to the first direction. The second direction is a direction defined within the plane in parallel with the placement surface 11.

Specific configurations of the primary scanning mechanism 21 and the secondary scanning mechanism 22 may be any configuration. For example, each of the primary scanning mechanism 21 and the secondary scanning mechanism 22 may include various types of linear motion driving mechanisms (for example, a linear motion driving mechanism including a ball screw mechanism and a motor, a linear motion driving mechanism including a linear motor, a linear motion driving mechanism including a piston cylinder, or the like), or may be a combination of various types of linear motion driving mechanisms and linear motion guide mechanisms (a linear motion guide, an air slider, or the like).

The stage driving part 2 is electrically connected to the controller 5 (specifically, a stage drive controller 502 to be described later), and operates in accordance with instructions from the controller 5. In other words, the stage driving part 2 moves the stage 1 at the timing instructed by the controller 5, in the instructed direction, and by the instructed distance.
(Image Capturer 3)

The image capturer 3 is a unit that captures images of the object 9 placed on the stage 1, and includes a light source 31, an optical component 32 included an irradiation optical system K1, optical components 33 to 38 included an imaging optical system K2, and an image capturing member 39.

The light source 31 emits illumination light. As the light source 31, various types of light sources can be used, such as a light emitting diode, a laser diode, a halogen lamp, a pulse laser, and a continuous oscillation laser. The illumination light may be visible light, or may be invisible light such as ultraviolet light and infrared light.

The irradiation optical system K1 is disposed between the light source 31 and the stage 1. The irradiation optical system K1 is provided to optically adjust the illumination light emitted from the light source 31 so as to irradiate the object 9 placed on the stage 1. Specifically, for example, the irradiation optical system K1 includes a condenser lens 32 that concentrates the illumination light emitted from the light source 31 onto the object 9, and the like.

The imaging optical system K2 is disposed between the stage 1 and the image capturing member 39. The imaging optical system K2 forms an image of light, which is generated in the object 9 in reaction to the irradiation of light onto the object 9 owing to the irradiation optical system K1, on a light receiving surface (image capturing surface) 391 of the image capturing member 39. Specifically, for example, the imaging optical system K2 includes an objective lens 33, a relay optical system 34, a field stop 35, a bandpass filter 36, a diffractor 37, an imaging lens 38, and the like.

The objective lens 33 is a lens for magnifying the object 9 to project an image thereof, and may be formed with a standard microscope objective lens (as an example, an infinity corrected microscope objective lens). The objective lens 33 is disposed in such an orientation that the optical axis of the objective lens 33 is perpendicular to the placement surface 11 of the stage 1. Further, the objective lens 33 has a front focal point and a back focal point, and is provided to face the stage 1 so that the front focal point (front focal plane) is located on the placement surface 11 side (object 9 side) with respect to the stage 1.

The relay optical system 34 relays (projects) a pupil plane (entrance pupil position) of the objective lens 33 to a disposition position of the diffractor 37. In other words, the relay optical system 34 is an optical component that relays the back focal point (back focal plane) of the objective lens 33, and the diffractor 37 is disposed at the position to which the back focal plane of the objective lens 33 is relayed by the relay optical system 34. The relay optical system 34 may have any configuration as long as the relay optical system 34 can relay the back focal plane of the objective lens 33. As an example, the relay optical system 34 includes a first relay lens 341 and a second relay lens 342. A mirror 301 may be provided between the objective lens 33 and the relay optical system 34 at an appropriate position in an appropriate orientation.

The field stop 35 is an aperture that limits the field of view, and is disposed at a position where an image (intermediate image) of the object 9 is formed by the relay optical system 34 (specifically, for example, on an image plane of the first relay lens 341, that is, at an intermediate position between the pair of relay lenses 341 and 342). An image of light that has passed through the field stop 35 is formed on the light receiving surface 391 of the image capturing member 39. In other words, the shape and the size of the unit image capturing region E (that is, an image capturing field-of-view region) as a target of image capturing in the image capturer 3 are determined by the field stop 35. The shape and the size of the unit image capturing region E, however, need not necessarily be determined by the field stop 35, and may be determined by, for example, an irradiation region of irradiation light radiated from the light source 31 onto the object 9. In this case, the field stop 35 may be omitted.

The bandpass filter 36 is a filter that allows through a predetermined wavelength range, and attenuates a wavelength range other than the predetermined wavelength range. Specifically, for example, the bandpass filter 36 is configured using a dielectric multi-layer film filter, a filter glass, a liquid crystal tunable filter, or the like. Here, a narrow wavelength range including a wavelength range λ diffracted by the diffractor 37 is the wavelength range that the bandpass filter 3 allows through. In other words, the bandpass filter 36 attenuates the wavelength range other than the narrow wavelength range including the wavelength range k diffracted in the diffractor 37.

The diffractor 37 is an optical component that generates a plurality of rays of diffracted light from light entering through the objective lens 33. Note that the "diffracted light" herein also includes diffracted light of 0 order. As described above, the diffractor (diffractive member) 37 is disposed on the back focal plane of the objective lens 33 relayed by the relay optical system 34. In other words, the diffractor 37 is disposed on a Fourier plane of the objective lens 33, that is, a Fourier plane having a Fourier transform relationship with the surface as a target of image capturing. Specific configurations of the diffractor 37 will be described later.

The imaging lens 38 is a lens for forming an image of the object 9 on the light receiving surface 391 of the image capturing member 39, and is provided so that a back focal point of the imaging lens 38 is located on the light receiving surface 391 of the image capturing member 39.

The image capturing member 39 is a digital camera including a digital image sensor (specifically, for example, a charge coupled device (CCD) image sensor, a complementary metal oxide semiconductor (CMOS) image sensor, or the like). The image capturing member 39 according to the present embodiment has its light receiving elements (image capturing elements) being two-dimensionally arrayed, in such a manner that the image capturing member 39 has a two-dimensional light receiving surface (image capturing surface) 391 (what is called an area sensor). As described above, in the image capturer 3, light generated in the object 9 in reaction to the irradiation of light onto the object 9 owing to the irradiation optical system K1 passes through the imaging optical system K2, and an image of the light is formed on the light receiving surface 391 of the image capturing member 39. The image capturing member 39 detects intensity of the light received on the light receiving surface 391, converts the intensity into a digital signal, and outputs the digital signal to the controller 5. Based on detection results acquired from the image capturing member 39, the controller 5 generates a captured image (specifically, for example, a captured image representing distribution (intensity distribution) of the light incident on the light receiving surface 391).

(Lens Driving Part 4)

The lens driving part (the lens driver) 4 relatively moves the objective lens 33 along the optical axis of the objective lens 33 with respect to the stage 1, and thereby moves the focal position when the image capturer 3 performs image capturing. As described above, the objective lens 33 is disposed in such an orientation that the optical axis of the objective lens 33 is perpendicular to the placement surface 11 of the stage 1, and the lens driving part 4 relatively moves the objective lens 33 in a direction perpendicular to the placement surface 11. For the sake of convenience, an optical axis direction of the objective lens 33 is hereinafter also referred to as a "height direction".

Specific configurations of the lens driving part 4 may be any configuration. For example, the lens driving part 4 may include a piezoelectric element, may include various types of linear motion driving mechanisms (for example, a linear motion driving mechanism including a ball screw mechanism and a motor, a linear motion driving mechanism including a linear motor, a linear motion driving mechanism including a piston cylinder, or the like), or may be a combination of various types of linear motion driving mechanisms and linear motion guide mechanisms (a linear motion guide, an air slider, or the like).

The lens driving part 4 is electrically connected to the controller 5 (specifically, a lens drive controller 504 to be described later), and operates in accordance with instructions from the controller 5. In other words, the lens driving part 4 moves the objective lens 33 along the optical axis at the timing instructed by the controller 5, by the instructed distance.

(Controller 5)

Figure 2:
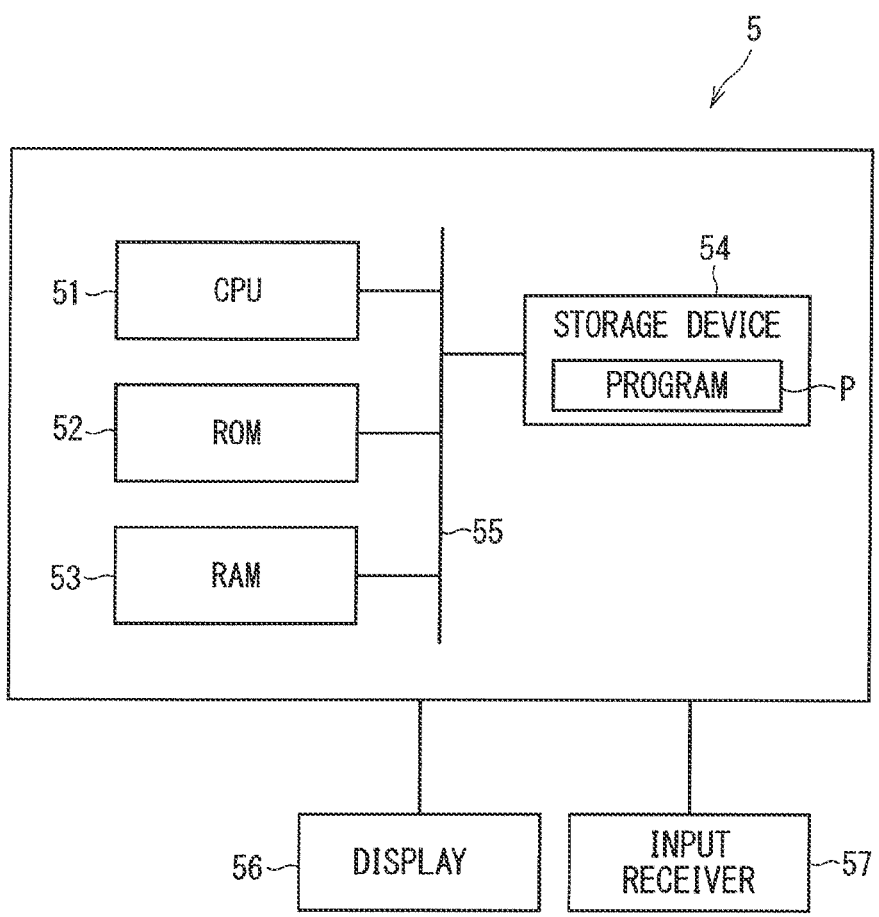
FIG. 2 is a block diagram illustrating a hardware configuration of a controller.

The controller 5 is an element that controls operations of each part included in the image capturing apparatus 100, and includes, for example, a general computer including an electric circuit. Specifically, for example, as illustrated in FIG. 2, the controller 5 includes a central processor unit (CPU) 51 as a central processing device to perform data processing, a read only memory (ROM) 52 storing basic programs and the like, a random access memory (RAM) 53 used as a working area when the CPU 51 performs predetermined processing (data processing), a storage device 54 including a non-volatile storage device, such as a flash memory, and a hard disk device, a bus line 55 connecting these to one another, and the like. The storage device 54 stores a program P for determining processing to be executed by the controller 5. The CPU 51 executes the program P, thereby enabling the controller 5 to execute the processing determined by the program P. A part or all of the processing to be executed by the controller 5 may be executed by hardware (for example, a dedicated processor), such as a dedicated logic circuit.

Further, the controller 5 is connected with a display part (a display) 56 that displays various pieces of information, an input part (an input receiver) 57 that receives input operations from an operator, and the like. As the display 56, various types of display devices can be used, such as a liquid crystal display. Further, as the input receiver 57, a keyboard, a mouse, a touch panel, a microphone, or the like can be used.

<2. Diffractor>

Figure 3:
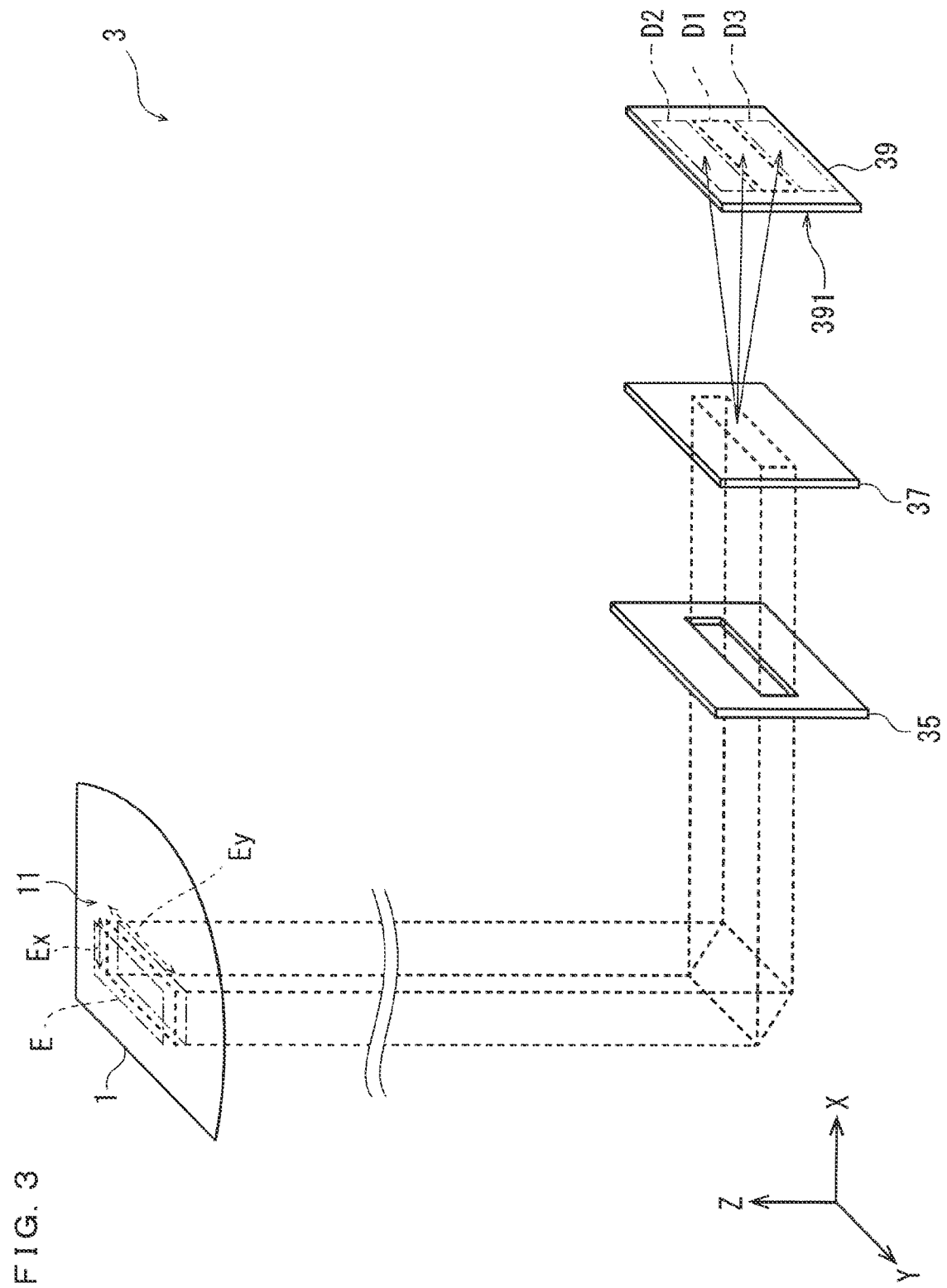
FIG. 3 is a schematic diagram for illustrating an image capturer.
Figure 5:
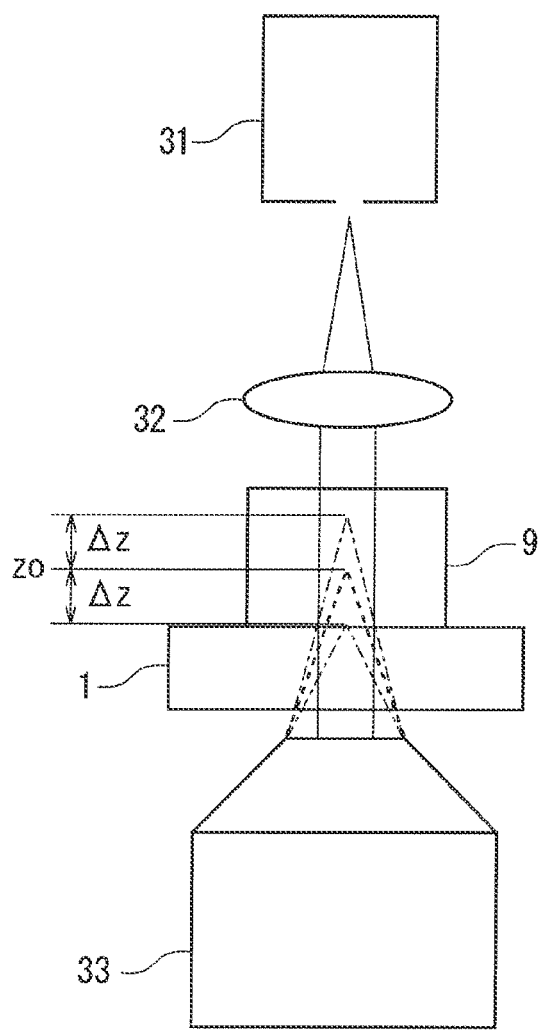
FIG. 5 is a schematic diagram for illustrating focusing positions of respective rays of diffracted light.

Next, the diffractor 37 included in the image capturer 3 will be described with reference to FIG. 3 to FIG. 5 as well as FIG. 1. FIG. 3 is a diagram for illustrating the image capturer 3, and schematically illustrates a part of elements (the field stop 35, the diffractor 37, and the image capturing member 39) included in the image capturer 3. FIG. 4 is a schematic diagram for illustrating the diffractor 37 and the light receiving surface 391 that receives diffracted light diffracted by the diffractor 37. FIG. 5 is a schematic diagram for illustrating focusing positions of respective rays of diffracted light. Note that FIG. 3 as well as other figures has an illustration of a coordinate system as appropriate, where a primary scanning direction is defined as "X direction", a secondary scanning direction is defined as "Y direction", and a height direction is defined as "Z direction".

The diffractor 37 is an optical component that generates a plurality of rays of diffracted light from incident light, that is, an optical component that separates (diffracts) incident light into rays of diffracted light of different orders (0 order, ±1 order, . . . ) of diffraction. Specifically, for example, the diffractor 37 includes a phase modulation diffraction grating (w % bat is called a phase grating) that separates incident light into rays of diffracted light of different orders of diffraction with use of a plurality of grooves 371 (roughened structure). Here, a depth (level difference) of each groove 371 is set to have a dimension according to an optical path difference ($\lambda/2$), so that a phase difference n is generated between a ray of light transmitting through the groove 371 (recessed portion) and another ray of light transmitting through a portion (projecting portion) between adjacent grooves 371.

Specifically, for example, in the diffractor 37, the plurality of grooves 371 are arrayed along a predetermined array direction Q. Light entering such a diffractor 37 is separated in the array direction Q of the grooves 371.

Note that the diffractor 37 is a multifocal diffractor, and in addition to the function of separating incident light into rays of light of different orders of diffraction, the diffractor 37 has a function of differentiating the focusing positions of the respective separated rays of diffracted light from each other. In other words, in the diffractor 37, each of the plurality of grooves 371 arrayed along the array direction Q has a curved shape according to a predetermined function, which differentiates the focusing positions of the respective separated rays of diffracted light from each other. More specifically, the focusing positions of the plurality of rays of diffracted light separated by the diffractor 37 are symmetrically distributed with respect to the focusing position of the ray of diffracted light of 0 order, and the focusing positions of adjacent rays of diffracted light are each shifted by a certain interval $\Delta z$. Further, since the ray of diffracted light of 0 order is not affected by the curves of the grooves 371, the focusing position of the ray of diffracted light of 0 order corresponds to the focal position of the objective lens 33. In other words, provided that the focal position (front focal plane) of the objective lens 33 is represented by "z=zo", the focusing position of the ray of diffracted light of 0 order is represented by "z=zo", the focusing position of the ray of diffracted light of +1 order is represented by "z=zo+$\Delta z$", and the focusing position of the ray of diffracted light of −1 order is represented by "z=zo−$\Delta z$" (FIG. 5). Note that the intervals (focusing intervals) $\Delta z$ of the focusing positions between adjacent rays of diffracted light are determined by a pattern of the grooves 371 in the diffractor 37 (curvature of each groove 371 in the diffractor 37 illustrated in the drawings). In other words, by making an adjustment to the pattern of the grooves 371, the focusing intervals $\Delta z$ can be set to any value.

The image capturing member 39 has a plurality of segment regions Di (i=1, 2 . . . ) being defined in its light receiving surface 391, and each of the plurality of rays of diffracted light generated in the diffractor 37 is received in each segment region Di. Note that not all of the rays of diffracted light generated in the diffractor 37 need to be received in the light receiving surface 391, and at least a part of all of the rays of diffracted light generated in the diffractor 37 (particularly three or more rays of diffracted light including rays of diffracted light of 0 order and ±1 order) may be received in the light receiving surface 391.

For example, in the diffractor 37 in which the plurality of grooves 371 are arrayed in a row, a plurality of rays of diffracted light separated in the array direction Q of the grooves 371 are generated. Correspondingly, the light receiving surface 391 is equally divided with a plurality of dividing lines that are perpendicular to the separation direction Q and are in parallel with each other, and a plurality of (three in the example of the drawings) segment regions Di (i=1, 2, . . . ) are thereby defined along the separation direction Q in the light receiving surface 391.

In order that each ray of diffracted light generated in the diffractor 37 be received in each of the plurality of segment regions Di defined in the light receiving surface 391 as described above, here, the following requirements are satisfied. Firstly, the shape and the size of the field stop 35 or the irradiation region (irradiation region of the irradiation light radiated from the light source 31 onto the object 9) are determined, in such a manner that the shape and the size of the unit image capturing region E conform to those of the segment region Di (that is, an imaging region of each ray of diffracted light, which comes from the unit image capturing region E, passes through the diffractor 37, and is imaged on the light receiving surface 391, is congruent with each segment region Di). Secondly, an optical positional relationship between the diffractor 37 and the light receiving surface 391 is determined, in such a manner that the image of the ray of diffracted light of 0 order is formed on a segment region (first segment region) D1 located at the center along the separation direction Q. Thirdly, separation angles between the rays of diffracted light are determined, in such a manner that the image of the ray of diffracted light of +1 order is formed on a segment region (second segment region) D2 located on one side with respect to the first segment region D1 along the separation direction Q and the image of the ray of diffracted light of −1 order is formed on a segment region (third segment region) D3 located on the other side with respect to the first segment region D1 along the separation direction Q. Note that the separation angles between the rays of diffracted light are determined by the pattern of the grooves 371 in the diffractor 37 (a formation cycle (intervals) of the grooves 371 in the diffractor 37 illustrated in the drawings). Here, the pattern of the grooves 371 is determined so as to implement the separation angles according to the intervals of the segment regions Di on the light receiving surface 391.

Here, a captured image capturing the unit image capturing region E is referred to as a "unit captured image Pe". In this case, in a single image capturing, in the image capturer 3, rays of diffracted light are received (imaged) in each of the plurality of segment regions Di defined in the light receiving surface 391, and as many unit captured images Pe as the number of the segment regions Di are thereby acquired (FIG. 4). For example, provided that the number of segment regions Di defined in the light receiving surface 391 is "N", N unit captured images Pe are acquired in a single image capturing. These N unit captured images Pe are captured images capturing the same unit image capturing region E (that is, the same image capturing field-of-view region). Note that, as described above, the focusing positions of the respective rays of diffracted light separated by the diffractor 37 are different from each other. Accordingly, the focusing positions of the N unit captured images Pe are different from each other. In other words, the N unit captured images Pe acquired in a single image capturing correspond to a group of captured images (a group of multifocal captured images) capturing the same unit image capturing region E with the focusing positions being different from each other.

In the example of the drawings, three unit captured images Pe are acquired in a single image capturing, and these three unit captured images Pe correspond to a group of captured images capturing the same unit image capturing region E with the focusing positions being different from each other. In other words, provided that the focal position of the objective lens 33 is represented by "z=zo", a unit captured image Pe capturing the unit image capturing region E with its focus at "z=zo" is acquired in the first segment region D1, a unit captured image Pe capturing the unit image capturing region E with its focus at "z=zo+Δz" is acquired in the second segment region D2, and a unit captured image Pe capturing the unit image capturing region E with its focus at "z=zo−Δz" is acquired in the third segment region D3.

<3. Functional Configuration related to Image Capturing>

Figure 6:
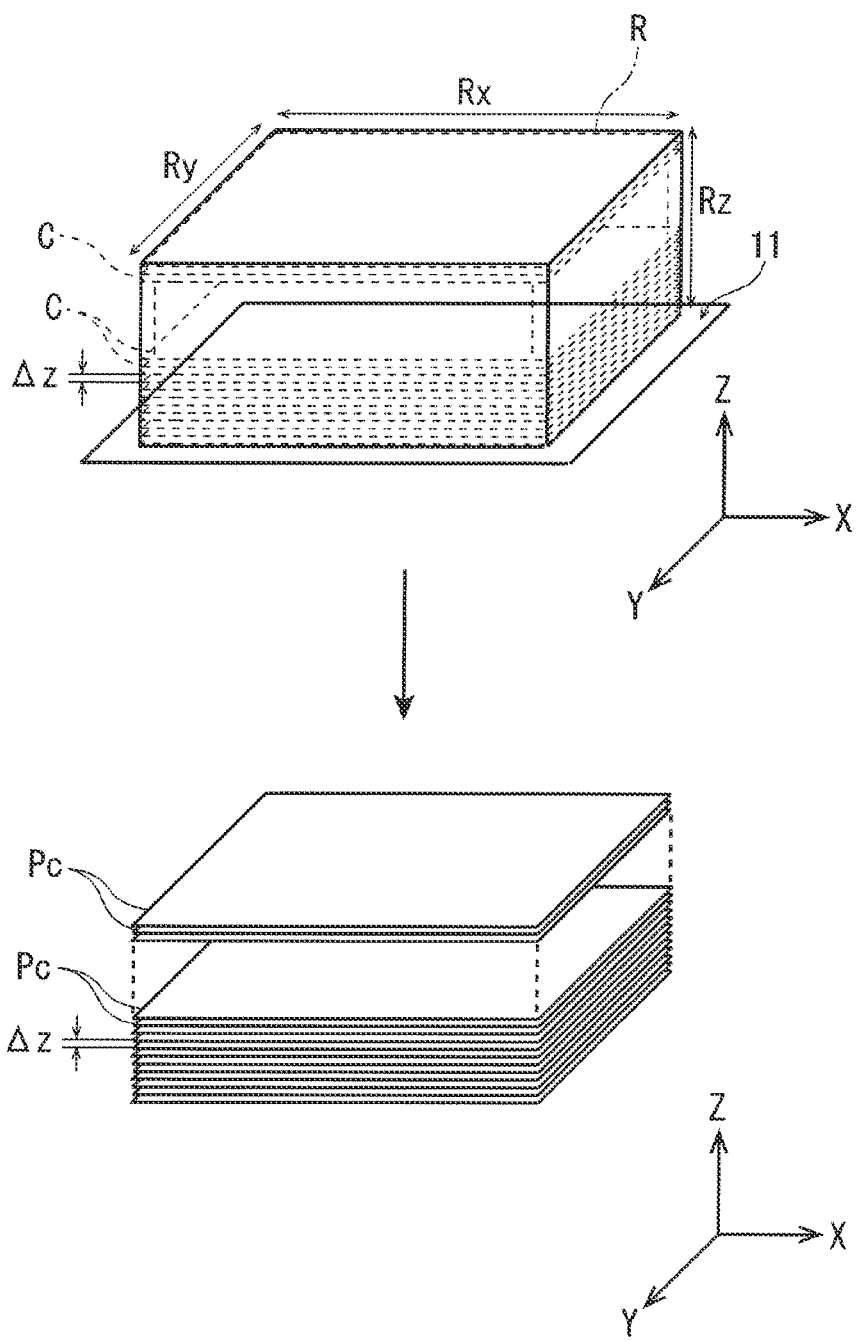
FIG. 6 is a diagram for illustrating a plurality of cross-sectional captured images acquired in the image capturing apparatus.

Given here is, as illustrated in FIG. 6, an image capturing region R being a three-dimensional region. In this case, the image capturing apparatus 100 has a function of acquiring a plurality of captured images (cross-sectional captured images) Pc. The plurality of cross-sectional captured images Pc are images that captured cross-sections (image capturing cross-sections) C of the image capturing region R taken along a plane (XY plane) in parallel with the placement surface 11 at predetermined focusing intervals Δz over the entire height direction of the image capturing region R. In other words, the image capturing apparatus 100 has a function of acquiring a plurality of cross-sectional captured images Pc, each of which focusing position is represented by "z=i×Δz (i=0, 1, 2, . . . )".

A configuration related to the function will be described with reference to FIG. 1 again. The controller 5 includes, as the configuration related to acquisition of the plurality of cross-sectional captured images Pc, an image capturing region reception part 501, a stage drive controller 502, an image capturing controller 503, and a lens drive controller 504. For example, these parts 501 to 504 are each a functional part implemented in the controller 5 by the CPU 51 executing the program P stored in the storage device 54.

At least a part of these parts 501 to 504 may be implemented by a dedicated processor or the like different form the CPU 51.

(Image Capturing Region Reception Part 501)

The image capturing region reception part 501 receives a specification regarding the image capturing region R from an operator or the like via the input receiver 57, for example. The image capturing region R is set as a three-dimensional region (FIG. 6). The image capturing region reception part 501 receives, for example, three values regarding the image capturing region R, namely a length Rx along the primary scanning direction, a length Ry along the secondary scanning direction, and a length Rz along the height direction, from an operator or the like, and thereby determines the image capturing region R having a rectangular parallelepiped shape. The image capturing region R may be a region including the whole object 9 placed on the stage 1, or may be a region including only a part of the object 9.

(Stage Drive Controller 502)

The stage drive controller 502 controls the stage driving part 2, and relatively moves the stage 1 within a plane (XY plane) in parallel with the placement surface 11 with respect to the image capturer 3. Specifically, for example, the stage drive controller 502 controls the primary scanning mechanism 21, and relatively moves the stage 1 in the primary scanning direction (X direction) with respect to the image capturer 3 (primary scanning operation). Further, the stage drive controller 502 controls the secondary scanning mechanism 22, and relatively moves the stage 1 in the secondary scanning direction (Y direction) with respect to the image capturer 3 (secondary scanning operation). Considering that the unit image capturing region E is moved in the primary scanning direction when the primary scanning operation is performed and the unit image capturing region E is moved in the secondary scanning direction when the secondary scanning operation is performed, the stage drive controller 502 repeatedly and alternately performs the primary scanning operation and the secondary scanning operation so that the unit image capturing region E is moved through the entire image capturing cross-section C (that is, so that the entire image capturing cross-section C is covered (wholly scanned) as the unit image capturing region E) (FIG. 9).

As described above, in the image capturer 3, the shape of the unit image capturing region E conforms to that of the segment region Di. As illustrated in FIG. 4, when N segment regions Di are defined with the light receiving surface 391 having a general aspect ratio being equally divided into N, for example, along the separation direction Q of diffracted light, the segment region Di is a flat elongated region with a length along the separation direction Q of diffracted light being shorter than a length along a direction perpendicular to the separation direction Q. Accordingly, the unit image capturing region E is an elongated region as well. Here, a positional relationship between the stage 1 and the image capturer 3 is set so that an extending direction of the unit image capturing region E being an elongated region matches the secondary scanning direction (Y direction) (that is, so that the unit image capturing region E is an elongated region extending in the secondary scanning direction). More specifically, the positional relationship between the stage 1 and the image capturer 3 is set so that the long side of the unit image capturing region E corresponding to the long side (side that is not divided into (1/N) in the light receiving surface 391) of the segment region Di extends along the secondary scanning direction, and the short side of the unit image capturing region E corresponding to the short side (side that is divided into (1/N) in the light receiving surface 391) of the segment region Di extends along the primary scanning direction (FIG. 3 and FIG. 9).

Figure 9:
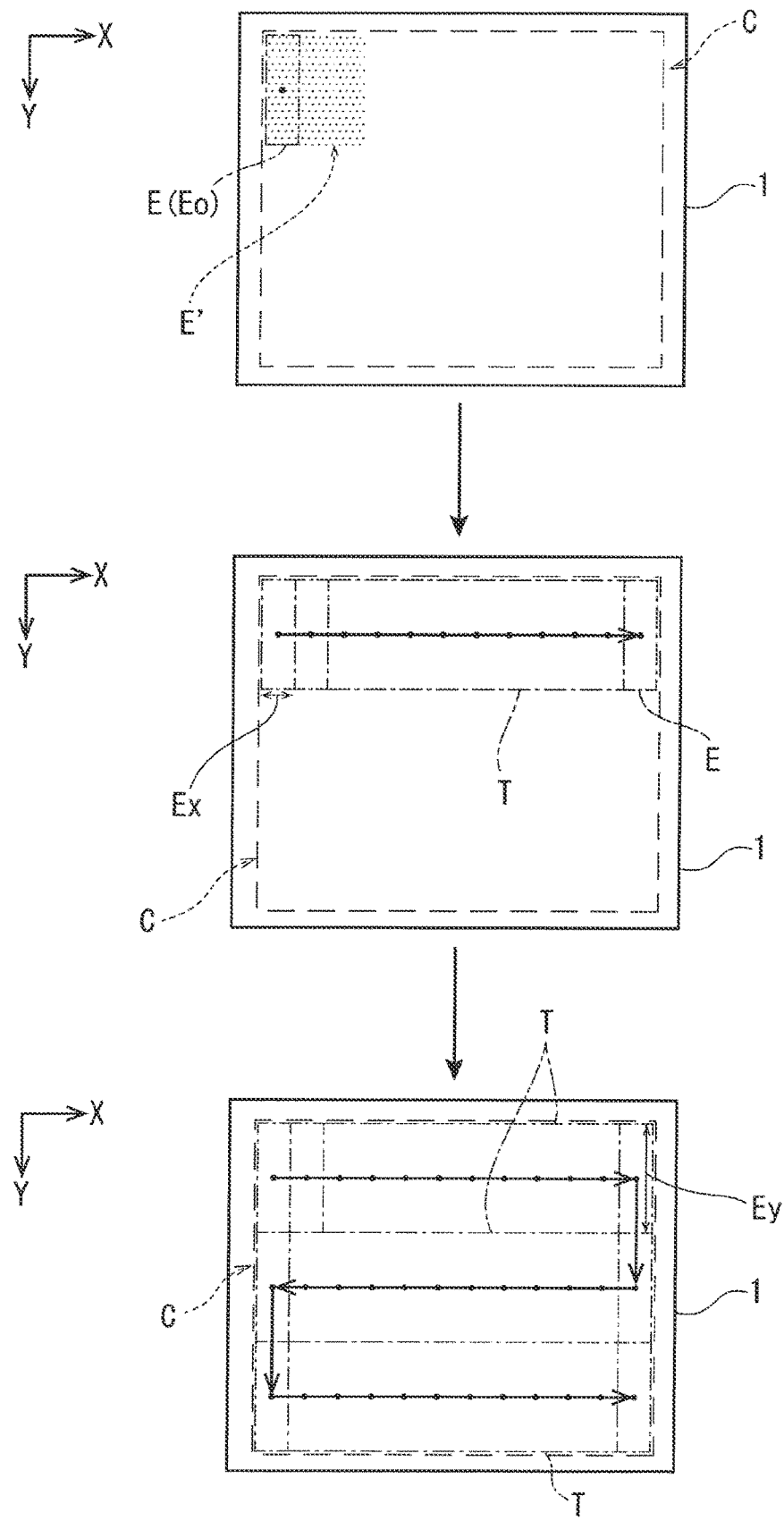
FIG. 9 is a diagram for illustrating an aspect of movement of a unit image capturing region in the planar scanning operation.

Here, in the configuration of acquiring the unit captured image Pe in each of N segment regions Di defined in the light receiving surface 391, N unit captured images Pe can be acquired in a single image capturing; however, the size of the unit image capturing region E is reduced to 1/N of the size of a unit image capturing region (comparison unit image capturing region) E' of a case in which a whole undivided light receiving surface 391 is used to acquire one captured image (FIG. 9). In other words, the image capturing field-of-view region is reduced to 1/N. Here, as in the above description, when the extending direction of the unit image capturing region E is arranged to match the secondary scanning direction, the dimension of the unit image capturing region E in the secondary scanning direction is maintained in the same size as that of the comparison unit image capturing region E'. Thus, the number of primary scanning operations necessary for the unit image capturing region E to move through the entire image capturing cross-section C is equal to the number of primary scanning operations necessary for the comparison unit image capturing region E' to move through the entire image capturing cross-section C. Accordingly, time necessary for the unit image capturing region E to move through the entire image capturing cross-section C is less liable to increase, regardless of the narrowing of the unit image capturing region E.

(Image Capturing Controller 503)

The image capturing controller 503 causes the image capturer 3 to perform image capturing. Specifically, for example, at the timing to cause the image capturer 3 to perform image capturing, the image capturing controller 503 performs appropriate control, such as that to open a shutter of the image capturing member 39, and thereby causes the image capturer 3 to perform image capturing. In other words, when appropriate control is performed, in the image capturer 3, the illumination light emitted from the light source 31 passes through the irradiation optical system K1 to irradiate upon the object 9, and light generated in the object 9 in reaction to the irradiation of the illumination light passes through the imaging optical system K2 (that is, sequentially passes through the objective lens 33, the relay optical system 34, the field stop 35, the bandpass filter 36, the diffractor 37, and the imaging lens 38), and an image of the light is formed on the light receiving surface 391 of the image capturing member 39. Then, detection results of the light received in the light receiving surface 391 are, for example, output from the image capturing member 39 to the controller 5, and a captured image is thereby generated in the controller 5.

Note that, as described above, the diffractor 37 included in the image capturer 3 has a function of not only separating incident light into rays of light of different orders of diffraction but also differentiating the focusing positions of the respective separated rays of diffracted light from each other (shifting the focusing positions by the focusing intervals $\Delta z$), and each of the plurality of rays of diffracted light generated in the diffractor 37 is received in each of the plurality of (N) segment regions Di defined in the light receiving surface 391 of the image capturing member 39. With this, in the image capturer 3, in a single image capturing, N unit captured images Pe capturing the same unit image capturing region E with the focusing positions being different from each other (the focusing positions being shifted by the focusing intervals $\Delta z$) are acquired (FIG. 4).

The image capturing controller 503 causes the image capturer 3 to perform image capturing a plurality of times, in parallel with the stage 1 being relatively moved with respect to the image capturer 3 and the unit image capturing region E being moved accordingly. Specifically, the image capturing controller 503 causes the image capturer 3 to perform image capturing a plurality of times at the timing in synchronization with the movement of the unit image capturing region E (this is also referred to as "synchronous image capturing"). In other words, the image capturing controller 503 causes the image capturer 3 to perform image capturing each time the unit image capturing region E is moved to a position adjacent to the previously captured region and not overlapping the previously captured region.

When image capturing is performed a plurality of times at the timing in synchronization with the movement of the unit image capturing region E and the unit captured images Pe acquired in each image capturing are then connected together, a captured image (wide captured image) of a region wider than the unit image capturing region E is acquired. Note that, as described above, in the image capturer 3, in a single image capturing, N unit captured images Pe capturing the same unit image capturing region E with the focusing positions being different from each other (the focusing positions being shifted by the focusing intervals $\Delta z$) are acquired. Thus, each time a single operation of acquiring the wide captured image is performed, N wide captured images with the focusing positions being different from each other (being shifted by the focusing intervals $\Delta z$) are acquired.

Figure 10:
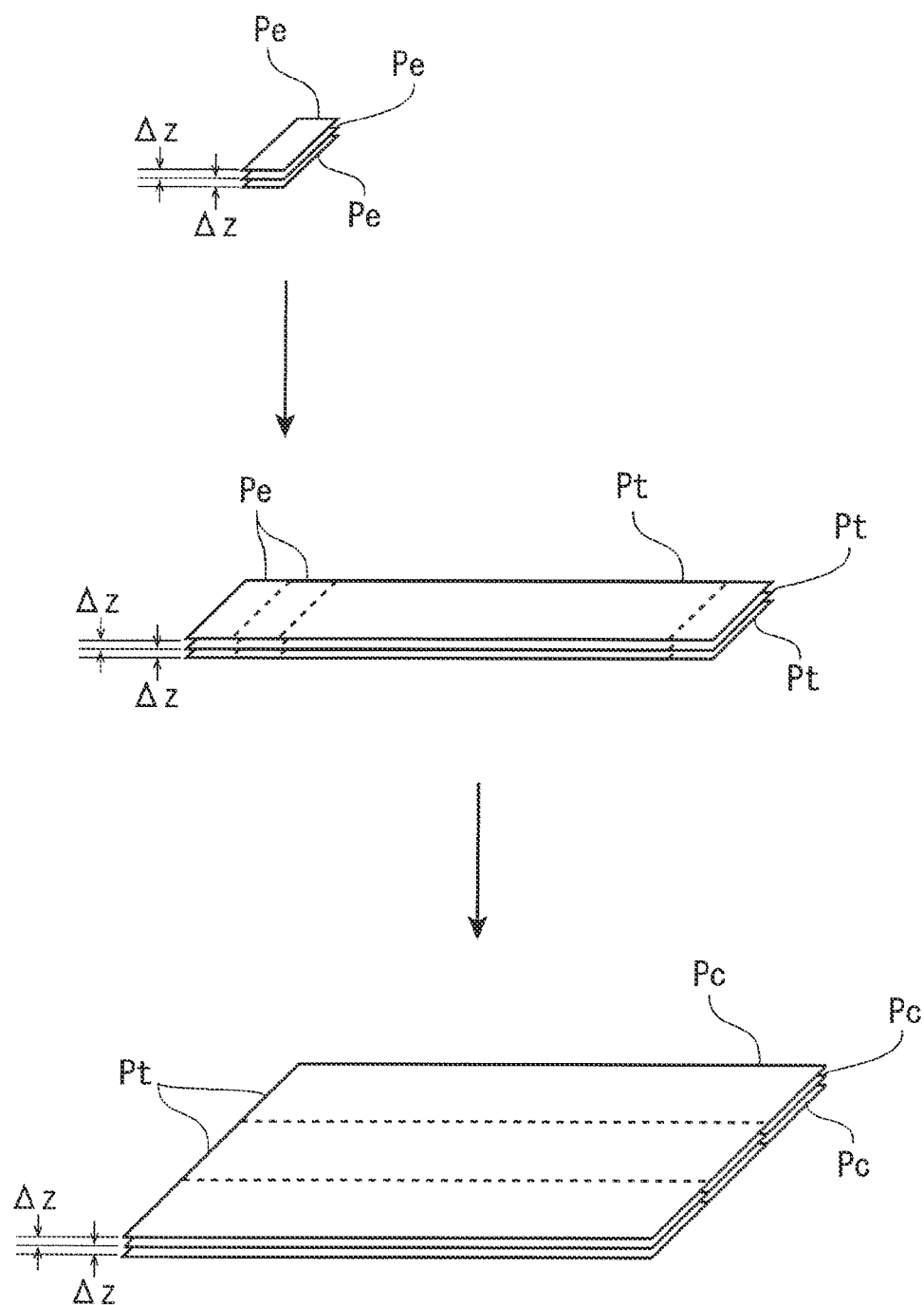
FIG. 10 is a diagram for illustrating an aspect in which the cross-sectional captured images are acquired in the planar scanning operation.

As will be described later, while the unit image capturing region E is moved through the entire image capturing cross-section C and in parallel with this movement, the image capturing controller 503 causes the image capturer 3 to perform image capturing a plurality of times at the timing in synchronization with the movement of the unit image capturing region E (this is also referred to as "planar scanning operation") (FIG. 9). When the unit captured images Pe acquired in each image capturing in the planar scanning operation are connected together, a cross-sectional captured image Pc being a captured image in the image capturing cross-section C is acquired (FIG. 10). Note that, as described above, in the image capturer 3, in a single image capturing, N unit captured images Pe capturing the same unit image capturing region E with the focusing positions being different from each other are acquired, and thus each time a single planar scanning operation is performed, N cross-sectional captured images Pc with the focusing positions being different from each other are acquired.

(Lens Drive Controller 504)

Figure 11:
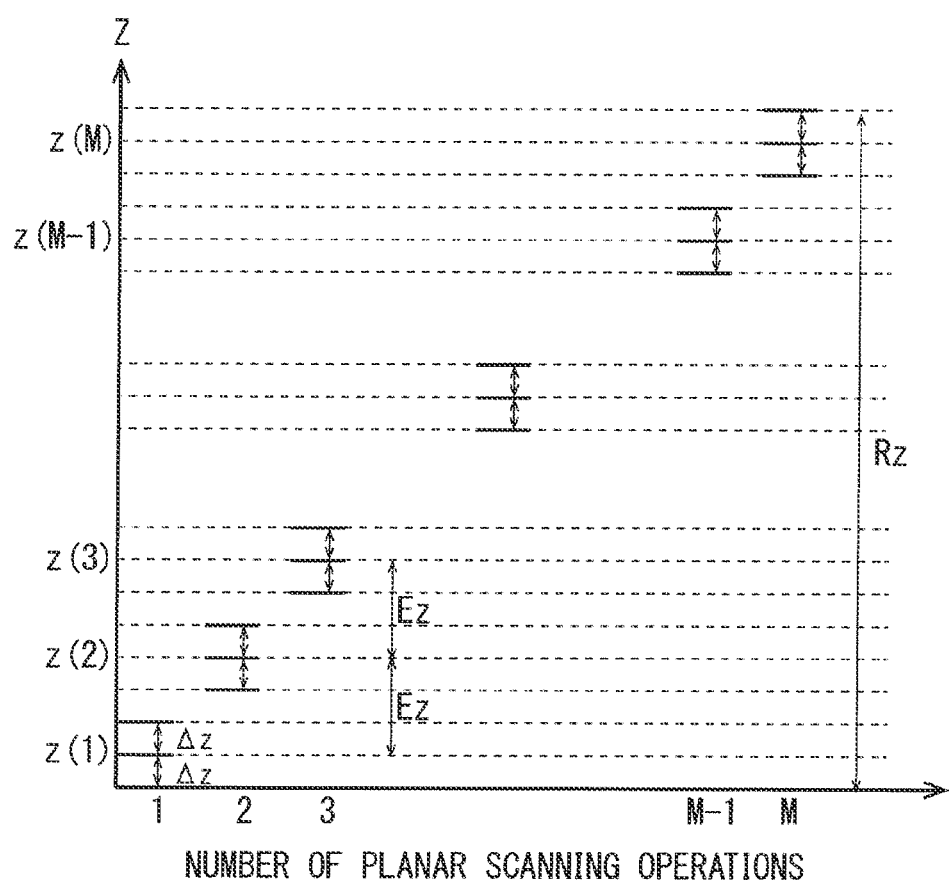
FIG. 11 is a diagram for illustrating a focal position of an objective lens in each planar scanning operation.
Figure 12:
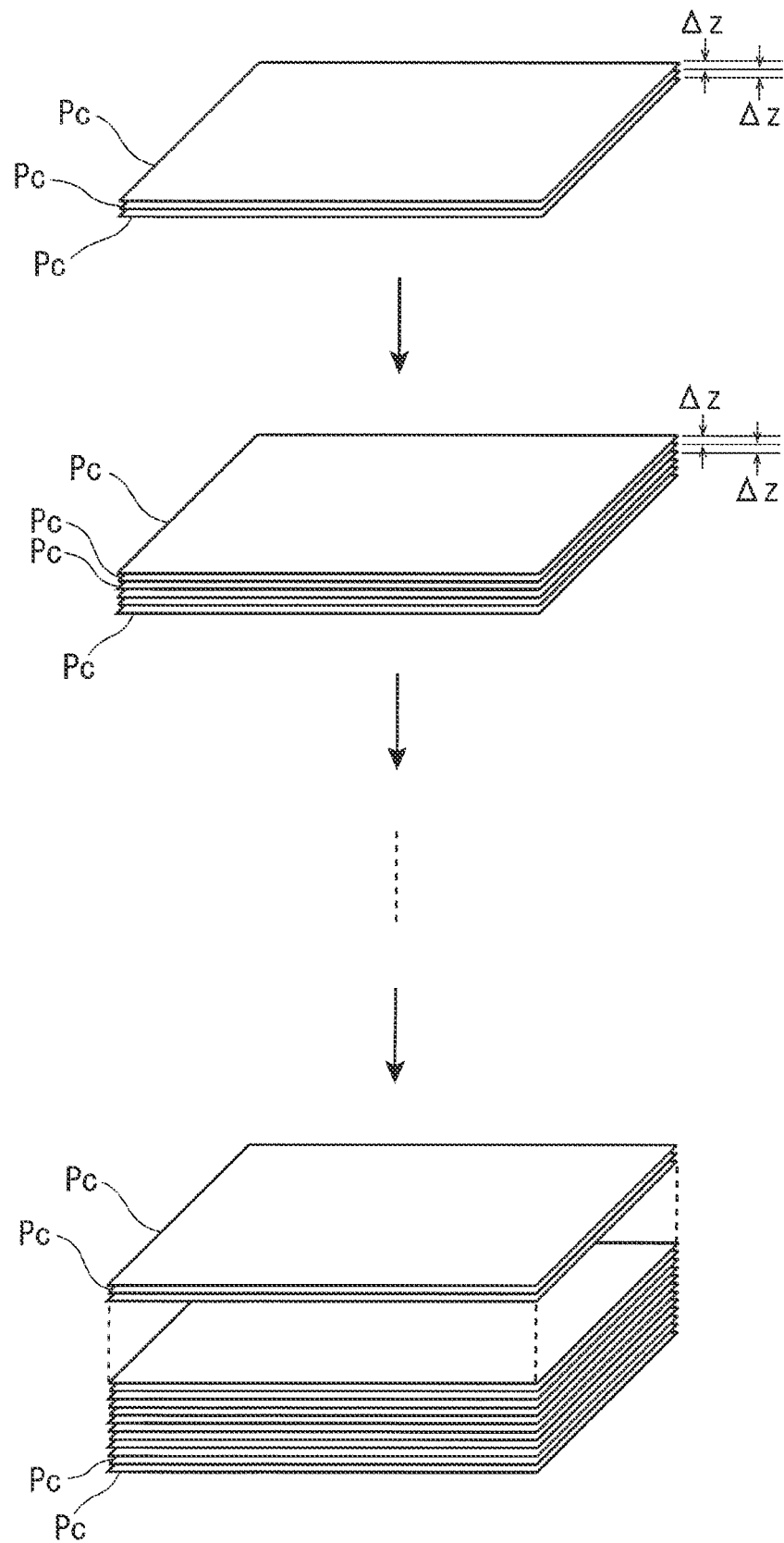
FIG. 12 is a diagram for illustrating an aspect in which a group of cross-sectional captured images are acquired by repeating the planar scanning operation.

The lens drive controller 504 controls the lens driving part 4, and relatively moves the objective lens 33 along the optical axis of the objective lens 33 (that is, in the height direction) with respect to the stage 1. As will be described later, each time a single planar scanning operation is performed, the lens drive controller 504 moves the objective lens 33 along the optical axis of the objective lens 33 by a predetermined unit width Ez. The "unit width Ez" is, for example, a distance calculated by multiplying the number N of cross-sectional captured images Pc acquired in a single planar scanning operation by the focusing interval $\Delta z$ (Ez=N×$\Delta z$). When the planar scanning operation is performed M times, for example, with the movement of the objective lens 33 as above being inserted between each of the M times of planar scanning operation, (M×N) cross-sectional captured images Pc with the focusing positions being different from each other (being shifted by the focusing intervals $\Delta z$) are acquired (FIG. 11 and FIG. 12). In other words, (M×N) cross-sectional captured images Pc are acquired, each of which focusing position is represented by "z=i×Δz (i=0, 1, 2, . . . )".

<4. Flow of Operation>

Figure 7:
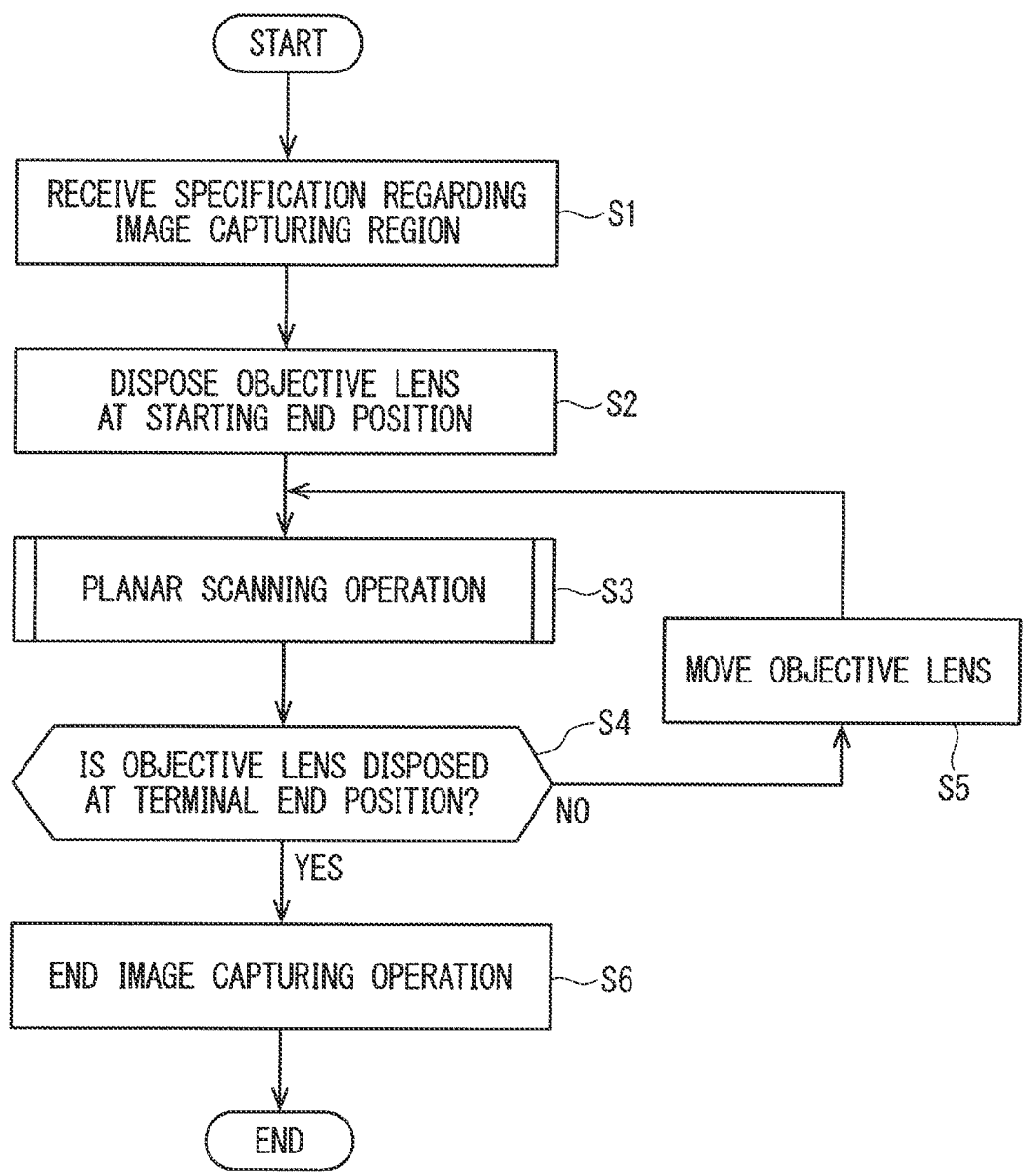
FIG. 7 is a diagram illustrating a flow of operation performed in the image capturing apparatus.
Figure 8:
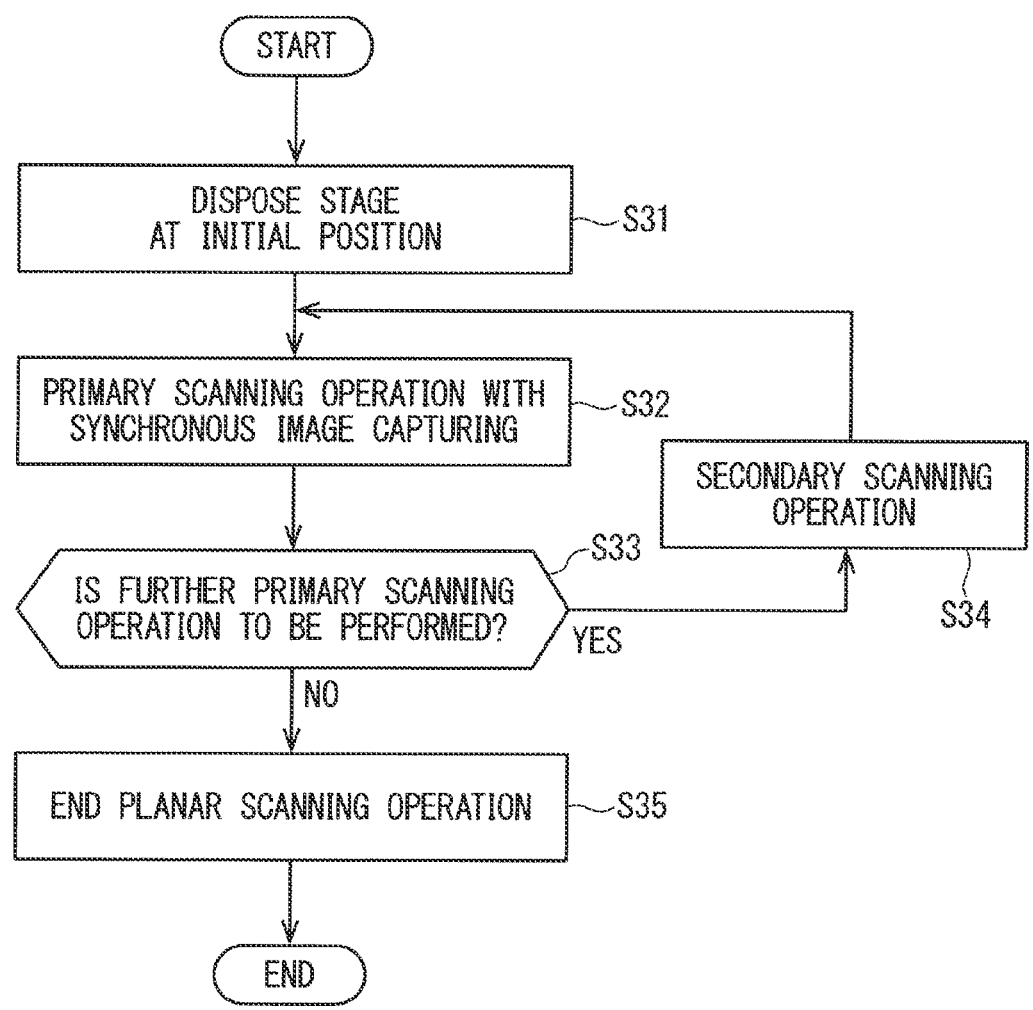
FIG. 8 is a diagram illustrating a flow of planar scanning operation.

A flow of operation performed in the image capturing apparatus 100 will be described with reference to FIG. 7 to FIG. 12. FIG. 7 is a diagram illustrating a flow of operation performed in the image capturing apparatus 100. FIG. 8 is a diagram illustrating a flow of the planar scanning operation. FIG. 9 is a diagram for illustrating an aspect of movement of the unit image capturing region E in the planar scanning operation. FIG. 10 is a diagram for illustrating an aspect in which the cross-sectional captured images Pc are acquired in the planar scanning operation. FIG. 11 is a diagram for illustrating the focal position of the objective lens 33 in each planar scanning operation. FIG. 12 is a diagram for illustrating an aspect in which a group of cross-sectional captured images Pc are acquired by repeating the planar scanning operation.

Step S1

First, the image capturing region reception part 501 receives a specification regarding the image capturing region R from an operator or the like via the input receiver 57, for example. Specifically, for example, the image capturing region reception part 501 receives three values regarding the image capturing region R, namely the length Rx along the primary scanning direction, the length Ry along the secondary scanning direction, and the length Rz along the height direction, from an operator or the like, and thereby determines the image capturing region R having a rectangular parallelepiped shape (FIG. 6).

Step S2

Next, the lens drive controller 504 controls a lens driving part 4, and disposes the objective lens 33 at a predetermined starting end position z (1). Specifically, for example, the starting end position z (1) of the objective lens 33 is such a position that the focusing position of the unit captured image Pe, which has the lowest focusing position among the N unit captured images Pe acquired in a single image capturing in the image capturer 3, corresponds to the lower end (z=0) of the image capturing region R in the height direction. For example, in the example of FIG. 4, when the focal position of the objective lens 33 is represented by "z=Δz", the focusing position of the unit captured image Pe acquired in the third segment region D3 corresponds to "z=0". Thus, the starting end position z (1) is determined to a position at which the focal position of the objective lens 33 corresponds to "z=Δz" (FIG. 11).

Step S3

Next, the planar scanning operation is performed. In other words, the stage drive controller 502 relatively moves the stage 1 with respect to the image capturer 3 so that the unit image capturing region E is moved through the entire image capturing cross-section C, and in parallel with this movement, the image capturing controller 503 causes the image capturer 3 to perform image capturing a plurality of times at the timing in synchronization with the movement of the unit image capturing region E (repeated image capturing step). The planar scanning operation will be described in detail with reference to FIG. 8 to FIG. 10.

Step S31

First, the stage drive controller 502 controls the primary scanning mechanism 21 and the secondary scanning mechanism 22, and disposes the stage 1 at a predetermined initial position. Specifically, for example, the initial position of the stage 1 is such a position that a region (initial region) Eo, in which a side of the initial region Eo on the −X side matches a side of the image capturing cross-section C on the −X side and a side of the initial region Eo on the −Y side matches a side of the image capturing cross-section C on the −Y side, corresponds to the unit image capturing region E (uppermost part of FIG. 9).

Step S32

When the stage 1 is disposed at the initial position, the stage drive controller 502 controls the primary scanning mechanism 21, and moves the stage 1 in the primary scanning direction (primary scanning operation). In a first (odd-numbered) primary scanning operation, the stage 1 is moved in the −X direction. When the stage 1 is relatively moved in the −X direction with respect to the image capturer 3, the unit image capturing region E is moved in the +X direction. When the unit image capturing region E crosses the entire image capturing cross-section C along the primary scanning direction, the stage drive controller 502 controls the primary scanning mechanism 21, and stops the movement of the stage 1 in the primary scanning direction. This completes a single primary scanning operation (middle part of FIG. 9).

In parallel with the primary scanning operation, the image capturing controller 503 causes the image capturer 3 to perform image capturing a plurality of times at the timing in synchronization with the movement of the unit image capturing region E (synchronous image capturing). Specifically, for example, the image capturing controller 503 causes the image capturer 3 to perform first image capturing at the timing when the movement of the stage 1 is started, and thereafter causes the image capturer 3 to perform image capturing each time the stage 1 is moved by a unit width Ex. Here, the "unit width Ex" refers to a length Ex of the unit image capturing region E along the primary scanning direction. Note that, here, the stage 1 is not stopped at each of the timings when the image capturer 3 performs image capturing. In other words, the stage 1 is moved in the primary scanning direction at a regular moving velocity V, and in parallel with this movement, the image capturer 3 performs image capturing at regular intervals ΔT (=Ex/V).

In the first image capturing performed at the timing when movement of the stage 1 is started, the unit captured image Pe capturing the initial region Eo is acquired (uppermost part of FIG. 10). Further, subsequently, in each image capturing performed every time the stage 1 is moved by the unit width Ex, the unit captured image Pe capturing a region adjacent to the previously captured region regarding the primary scanning direction and not overlapping the previously captured region regarding the primary scanning direction is acquired. Thus, when the unit captured images Pe acquired in each image capturing performed a plurality of times during a single primary scanning operation are connected together in the primary scanning direction, a captured image (band-like captured image) Pt of a band-like region T extending over the entire image capturing cross-section C along the primary scanning direction is acquired (middle part of FIG. 10). Note that, as described above, in each image capturing in the image capturer 3, N unit captured images Pe capturing the same unit image capturing region E with the focusing positions being different from each other (the focusing positions being shifted by the focusing intervals Δz) are acquired. Thus, each time a single primary scanning operation with synchronous image capturing is performed, N band-like captured images Pt with the focusing positions being different from each other (being shifted by the focusing intervals Δz) are acquired.

Step S33

Next, the stage drive controller 502 determines whether or not a further primary scanning operation is to be performed. Specifically, for example, the stage drive controller 502 determines whether or not the band-like region T captured in the band-like captured image Pt acquired in Step S32 has reached the end (here, the end on the +Y side) of the image capturing cross-section C in the secondary scanning direction. If the band-like region T has not reached the end, the stage drive controller 502 determines that a further primary scanning operation is to be performed, whereas if the band-like region T has reached the end, the stage drive controller 502 determines that a further primary scanning operation is not to be performed.

Step S34

When it is determined that a further primary scanning operation is to be performed (YES in Step S33), the stage drive controller 502 controls the secondary scanning mechanism 22, and moves the stage 1 in the secondary scanning direction (secondary scanning operation). Specifically, the stage drive controller 502 moves the stage 1 in the −Y direction by a unit width Ey. Here, the "unit width Ey" refers to a length Ey of the unit image capturing region E along the secondary scanning direction. When the stage 1 is relatively moved in the −Y direction with respect to the image capturer 3 by the unit width Ey, the unit image capturing region E is moved in the +Y direction by the unit width Ey.

When the secondary scanning operation is performed, the primary scanning operation is performed again (Step S32). Note that, in a second (even-numbered) primary scanning operation, the stage 1 is moved in the +X direction. When the stage 1 is relatively moved in the +X direction with respect to the image capturer 3, the unit image capturing region E is moved in the −X direction. In each of the second and subsequent primary scanning operations as well, in parallel with each primary scanning operation, the image capturing controller 503 causes the image capturer 3 to perform image capturing a plurality of times at the timing in synchronization of the movement of the unit image capturing region E. Thus, when each of the second and subsequent primary scanning operations (primary scanning operations with synchronous image capturing) is performed, the band-like captured image Pt of a band-like region T adjacent in the +Y direction to a band-like region T captured in the previous primary scanning operation is acquired. Needless to say, in each of the second and subsequent primary scanning operations as well, N band-like captured images Pt capturing the same band-like region T with the focusing positions being different from each other (the focusing positions being shifted by the focusing intervals Δz) are acquired.

Step S35

When it is determined that a further primary scanning operation is not to be performed (NO in Step S33), the planar scanning operation ends. When the band-like captured images Pt acquired in each of one or more primary scanning operations (primary scanning operations with synchronous image capturing) performed during a single planar scanning operation are connected together in the secondary scanning direction, the captured image (cross-sectional captured image) Pc of the image capturing cross-section C is acquired (lowermost part of FIG. 10). Note that, as described above, in each primary scanning operation, N band-like captured images Pt capturing the same band-like region T with the focusing positions being different from each other (the focusing positions being shifted by the focusing intervals Δz) are acquired. Thus, each time a single planar scanning operation is performed, N cross-sectional captured images Pc with the focusing positions being different from each other (being shifted by the focusing intervals Δz) are acquired.

Step S4

FIG. 7 is referred to again. When the planar scanning operation ends, next, the lens drive controller 504 determines whether or not the objective lens 33 is disposed at a terminal end position z (M). Specifically, for example, the terminal end position z (M) of the objective lens 33 is such a position that the focusing position of the unit captured image Pe, which has the highest focusing position among the N unit captured images Pe acquired in a single image capturing in the image capturer 3, corresponds to the upper end (z=Rz) or higher of the image capturing region R in the height direction (FIG. 11).

Step S5

When it is determined that the objective lens 33 is not disposed at the terminal end position z (M) (NO in Step S4), the lens drive controller 504 controls the lens driving part 4, and moves the objective lens 33 upward (that is, in the +Z direction) along the optical axis of the objective lens 33 by a predetermined unit width Ez. As described above, the "unit width Ez" is, for example, a distance calculated by multiplying the number N of cross-sectional captured images Pc acquired in a single planar scanning operation by the focusing interval Δz (Ez=N Δz).

When the objective lens 33 is moved, the planar scanning operation is performed again (Step S3). As described above, each time a single planar scanning operation is performed, N cross-sectional captured images Pc with the focusing positions being different from each other (being shifted by the focusing intervals Δz) are acquired. Since the objective lens 33 is moved by the unit width Ez before each planar scanning operation is performed, the focusing position of the cross-sectional captured image Pc, which has the lowest focusing position among the N cross-sectional captured images Pc acquired in each planar scanning operation, is shifted in the +Z direction by the focusing interval Δz in comparison to the focusing position of the cross-sectional captured image Pc, which has the highest focusing position among the N cross-sectional captured images Pc acquired in the previous planar scanning operation.

Step S6

When it is determined that the objective lens 33 is disposed at the terminal end position z (M) (YES in Step S4), the series of operations related to image capturing ends. When the objective lens 33 is moved by the unit width Ez from the starting end position z (1) to the terminal end position z (M) and the planar scanning operation is performed a plurality of times, a plurality of cross-sectional captured images Pc at the focusing intervals Δz over the entire height direction of the image capturing region R are acquired (FIG. 11 and FIG. 12). As described above, here, each time a single planar scanning operation is performed, N cross-sectional captured images Pc with the focusing positions being different from each other (being shifted by the focusing intervals Δz) are acquired, and thus when the planar scanning operation is performed M times, for example, (M×N) cross-sectional captured images Pc with the focusing positions being different from each other (being shifted by the focusing intervals Δz) are acquired. From another point of view, for example, when "L" cross-sectional captured images Pc need to be acquired, the number of planar scanning operations needs to be merely L/N. Therefore, a plurality of cross-sectional captured images Pc can be efficiently acquired.

<5. Effects>

The image capturing apparatus 100 according to the above-described embodiment includes the stage 1 on which the object 9 is placed, the image capturer (the image capturing unit) 3, and the controller 5 that relatively moves the stage 1 within a predetermined plane (plane (XY plane) in parallel with the placement surface 11) with respect to the image capturer 3 to move the unit image capturing region E captured by the image capturer 3, and simultaneously causes the image capturer 3 to perform image capturing a plurality of times. The image capturer 3 includes the light source 31 that emits illumination light, the objective lens 33 having an optical axis in a direction intersecting the predetermined plane (direction (Z direction) perpendicular to the placement surface 11), the multifocal diffractor (diffraction part) 37 that generates a plurality of rays of diffracted light including a ray of diffracted light of 0 order from incident light entering through the objective lens 33, the plurality of rays of diffracted light having focusing positions being different from each other, and the image capturing member (the image capturing part) 39 that receives each of the plurality of rays of diffracted light in each of the plurality of segment regions Di defined in the light receiving surface 391.

According to the configuration, the unit image capturing region E is moved and the image capturer 3 is simultaneously caused to perform image capturing a plurality of times, and thus when the unit captured images Pe each of them is acquired in each image capturing are connected together, a wide captured image (for example, the cross-sectional captured image Pc) of a region wider than the unit image capturing region E can be obtained. Here, in the image capturer 3, the plurality of rays of diffracted light having the focusing positions being different from each other are generated in the multifocal diffractor 37, and each ray of diffracted light is received in each of the plurality of segment regions Di defined in the light receiving surface 391 of the image capturing member 39. With this, in the image capturer 3, in a single image capturing, a plurality of unit captured images Pe capturing the same unit image capturing region E with the focusing positions being different from each other are acquired. Thus, for example, each time a single operation (planar scanning operation) of acquiring the cross-sectional captured image Pc is performed, a plurality of cross-sectional captured images Pc having the focusing positions being different from each other are acquired. Therefore, such a plurality of cross-sectional captured images Pc having the focusing positions being different from each other can be efficiently acquired.

When the plurality of cross-sectional captured images Pc having the focusing positions being different from each other are efficiently acquired, an image of the whole three-dimensional object 9 can be captured at high speed. Therefore, for example, the above-described configuration is particularly suitable for a case in which an image of a whole culture vessel, such as a microwell plate, needs to be captured at high speed for the purpose of screening of the object 9, or the like.

Further, in the image capturing apparatus 100 according to the above-described embodiment, the controller 5 alternately performs the primary scanning operation of moving the unit image capturing region E in the primary scanning direction and the secondary scanning operation of moving the unit image capturing region E in the secondary scanning direction intersecting the primary scanning direction to move the unit image capturing region E in an entire predetermined region (for example, the image capturing cross-section C), and causes the image capturer 3 to perform the image capturing of the plurality of times in parallel with the primary scanning operation. The unit image capturing region E is an elongated region extending in the secondary scanning direction.

According to the configuration, when the unit image capturing region E is set as an elongated region extending in the secondary scanning direction, the number of primary scanning operations necessary for the unit image capturing region E to move through the entire image capturing cross-section C, for example, can be reduced. As a result, time necessary for the unit image capturing region E to move through the entire image capturing cross-section C (that is, time required for the operation (planar scanning operation) of acquiring the cross-sectional captured image Pc) is less liable to increase.

Further, in the image capturing apparatus 100 according to the above-described embodiment, the light receiving surface 391 is segmented with dividing lines in parallel with each other, and the plurality of segment regions Di are thereby defined.

According to the configuration, each segment region Di extends across the entire light receiving surface 391 in one direction, and thus the unit image capturing region E can be set as an elongated region having a sufficient length in one direction. Thus, for example, by arranging the extending direction of the unit image capturing region E to match the secondary scanning direction, the number of primary scanning operations necessary for the unit image capturing region E to move through the entire image capturing cross-section C can be reduced.

Further, in the image capturing apparatus 100 according to the above-described embodiment, the controller 5 performs a plurality of times of the operation (planar scanning operation) of moving the unit image capturing region E in an entire predetermined region (for example, the image capturing cross-section C) and simultaneously causing the image capturer 3 to perform the image capturing of the plurality of times, with the operation of relatively moving the objective lens 33 along the optical axis with respect to the stage 1 being inserted between each of the plurality of times of the operation.

According to the configuration, for example, provided that, for example, N cross-sectional captured images Pc with the focusing positions being different from each other are acquired each time a single planar scanning operation is performed, when the planar scanning operation is performed M times, for example, (M×N) cross-sectional captured images Pc with the focusing positions being different from each other can be acquired.

<6. First Modification>

Figure 13:
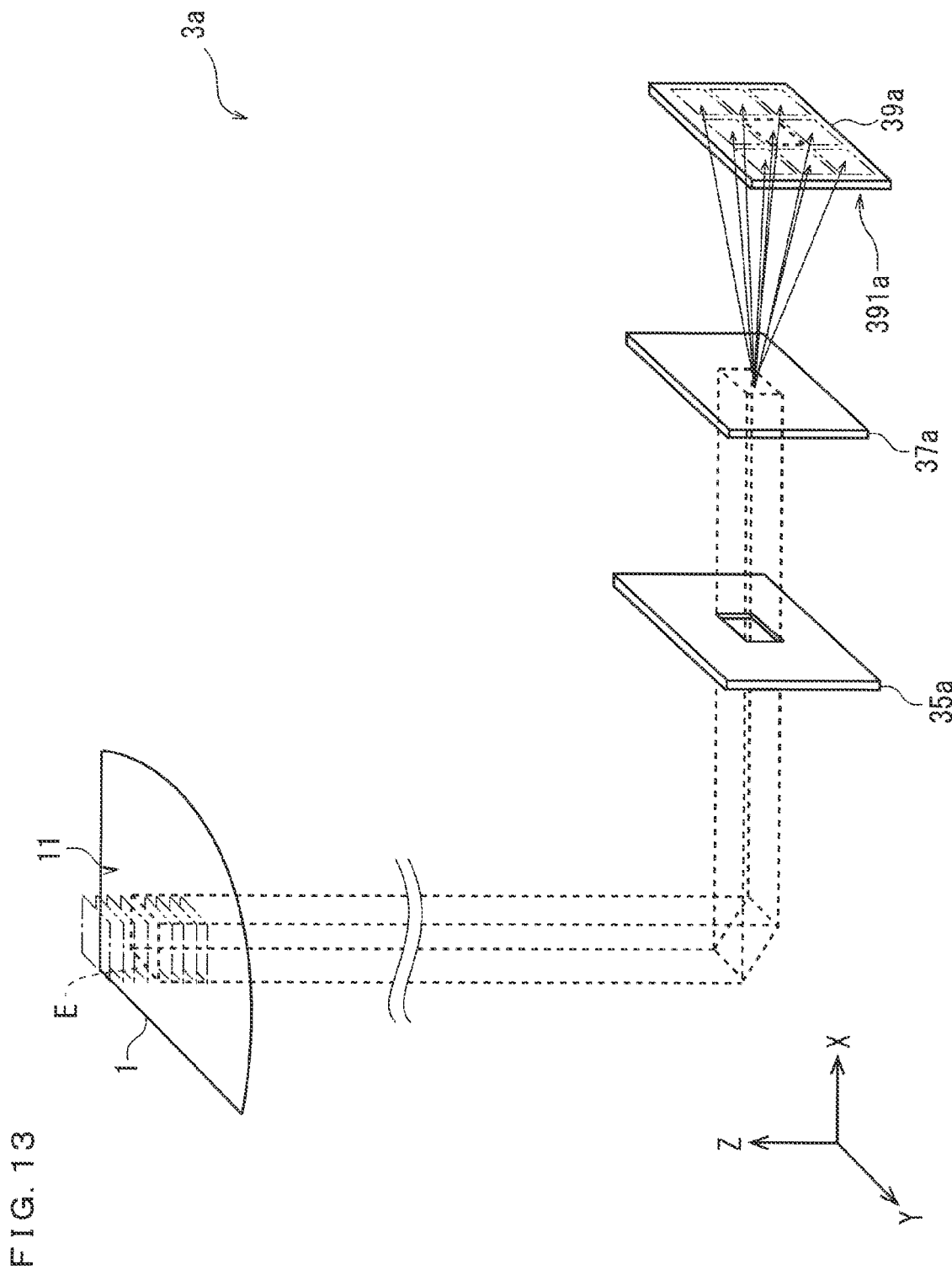
FIG. 13 is a schematic diagram for illustrating an image capturer according to a modification.
Figure 14:
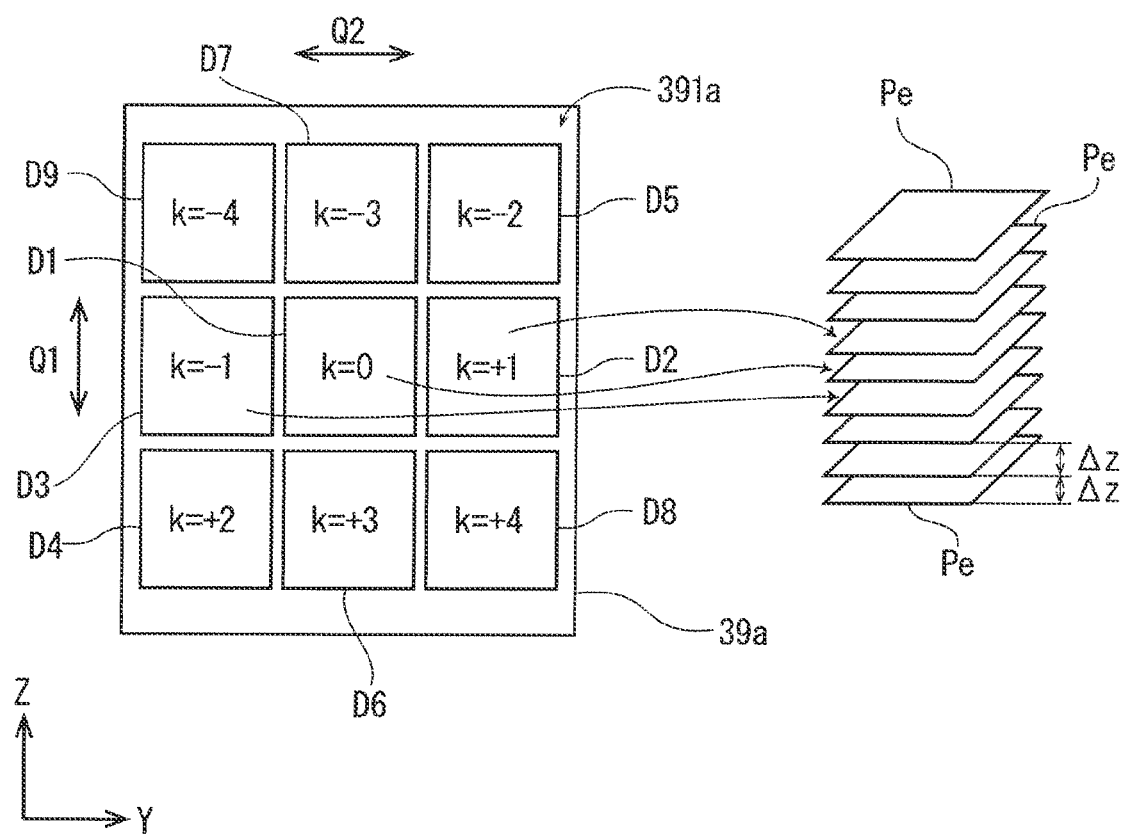
FIG. 14 is a schematic diagram for illustrating a light receiving surface that receives diffracted light diffracted by a diffractor according to the modification.

An image capturer 3a according to a modification will be described with reference to FIG. 13 and FIG. 14. FIG. 13 is a diagram for illustrating the image capturer 3a, and schematically illustrates a part of elements (a field stop 35a, a diffractor 37a, and an image capturing member 39a) included in the image capturer 3a. FIG. 14 is a schematic diagram for illustrating a light receiving surface 391a that receives diffracted light diffracted by a diffractor 37a. In the following, configurations different from the above-described embodiment will be described, and configurations not different therefrom will not be described.

Similarly to the diffractor 37 according to the above-described embodiment, the diffractor 37a includes a phase modulation diffraction grating that separates incident light into rays of diffracted light of different orders of diffraction with use of a plurality of grooves. In the diffractor 37a, with a pattern of the grooves being appropriately designed, a plurality of rays of diffracted light are generated, which are separated in a matrix pattern in a first separation direction Q1 and a second separation direction Q2 perpendicular to the first separation direction Q1.

Similarly to the diffractor 37 according to the above-described embodiment, the diffractor 37a is a multifocal diffractor, and differentiates the focusing positions of the respective separated rays of diffracted light from each other. More specifically, the focusing positions of the plurality of rays of diffracted light separated by the diffractor 37a are symmetrically distributed with respect to the focusing position of the ray of diffracted light of 0 order, and the focusing positions of adjacent rays of diffracted light are each shifted by a certain interval (focusing interval) Δz. Further, the focusing position of the ray of diffracted light of 0 order corresponds to the focal position of the objective lens 33. In other words, provided that the focal position of the objective lens 33 is represented by "z=zo", the focusing position of the ray of diffracted light of 0 order is represented by "z=zo", the focusing position of the ray of diffracted light of +k order is represented by "z=zo+kΔz", and the focusing position of the ray of diffracted light of –k order is represented by "z=zo–kΔz". Note that, in this case as well, the intervals (focusing intervals) Δz of the focusing positions between adjacent rays of diffracted light are determined by a pattern of the grooves in the diffractor 37a. In other words, by making an adjustment to the pattern of the grooves, the focusing intervals Δz can be set to any value.

Similarly to the image capturing member 39 according to the above-described embodiment, the image capturing member 39a has a plurality of segment regions Di (i=1, 2, ... ) being defined in the light receiving surface 391a, and each of the plurality of rays of diffracted light generated in the diffractor 37a is received in each segment region Di. As described above, in the diffractor 37a, a plurality of rays of diffracted light separated in a matrix pattern in two separation directions Q1 and Q2, are generated. Correspondingly, the light receiving surface 391a is segmented with grid-like dividing lines (specifically, the light receiving surface 391a is equally divided with a plurality of dividing lines extending in parallel with the first separation direction Q1 and a plurality of dividing lines extending in parallel with the second separation direction Q2), and a plurality of (nine in the example of the drawings) segment regions Di (i=1, 2, ... ) arrayed in a matrix pattern are thereby defined in the light receiving surface 391a.

In order that each ray of diffracted light generated in the diffractor 37a be received in each of the plurality of segment regions Di defined in the light receiving surface 391a as described above, here, the following requirements are satisfied. Firstly, the shape and the size of the field stop 35a (or the irradiation region) are determined, in such a manner that the shape and the size of the unit image capturing region E conform to those of the segment region Di. Secondly, an optical positional relationship between the diffractor 37a and the light receiving surface 391a is determined, in such a manner that the image of the ray of diffracted light of 0 order is formed on a segment region (first segment region) D1 located at the center along each of the separation directions Q1 and Q2. Thirdly, separation angles between the rays of diffracted light are determined, in such a manner that the image of any one of the rays of diffracted light of k order (k=±1, ±2, ±3, ±4) is formed on each segment region D2, D3 ... , D9 located around the first segment region D1. Note that the separation angles between the rays of diffracted light are determined by the pattern of the grooves in the diffractor 37a. Here, the pattern of the grooves is determined so as to implement the separation angles according to the intervals of the segment regions Di on the light receiving surface 391a.

Similarly to the image capturer 3 according to the above-described embodiment, in the image capturer 3a as well, each ray of diffracted light is received in each of the plurality of segment regions Di defined in the light receiving surface 391a, and as many unit captured images Pe as the number of the segment regions Di are thereby acquired in a single image capturing. In the example of the drawings, the number of segment regions Di defined in the light receiving surface 391a is nine, and accordingly nine unit captured images Pe are acquired in a single image capturing. Needless to say, these nine unit captured images Pe are a group of captured images capturing the same unit image capturing region E with the focusing positions being different from each other. Thus, while the unit image capturing region E is moved through the entire image capturing cross-section C, for example, and in parallel with this movement, the image capturer 3a performs image capturing a plurality of times at the timing in synchronization with the movement of the unit image capturing region E (planar scanning operation), and nine cross-sectional captured images Pc having the focusing positions being different from each other are thereby acquired.

In the image capturing apparatus equipped with the image capturer 3a according to the present modification, the light receiving surface 391a is segmented with grid-like dividing lines, and a plurality of segment regions Di (i=2, ... ) are thereby defined. Thus, the number of segment regions Di defined in the light receiving surface 391a can be set to a sufficiently large number. Therefore, the number of unit captured images Pe acquired in a single image capturing, or the number of cross-sectional captured images Pc acquired each time a single planar scanning operation is performed, becomes sufficiently large. With this, the number of planar scanning for acquiring a necessary number of cross-sectional captured images Pc can be reduced especially, and a plurality of cross-sectional captured images Pc can be efficiently acquired especially.

<7. Second Modification>

Figure 15:
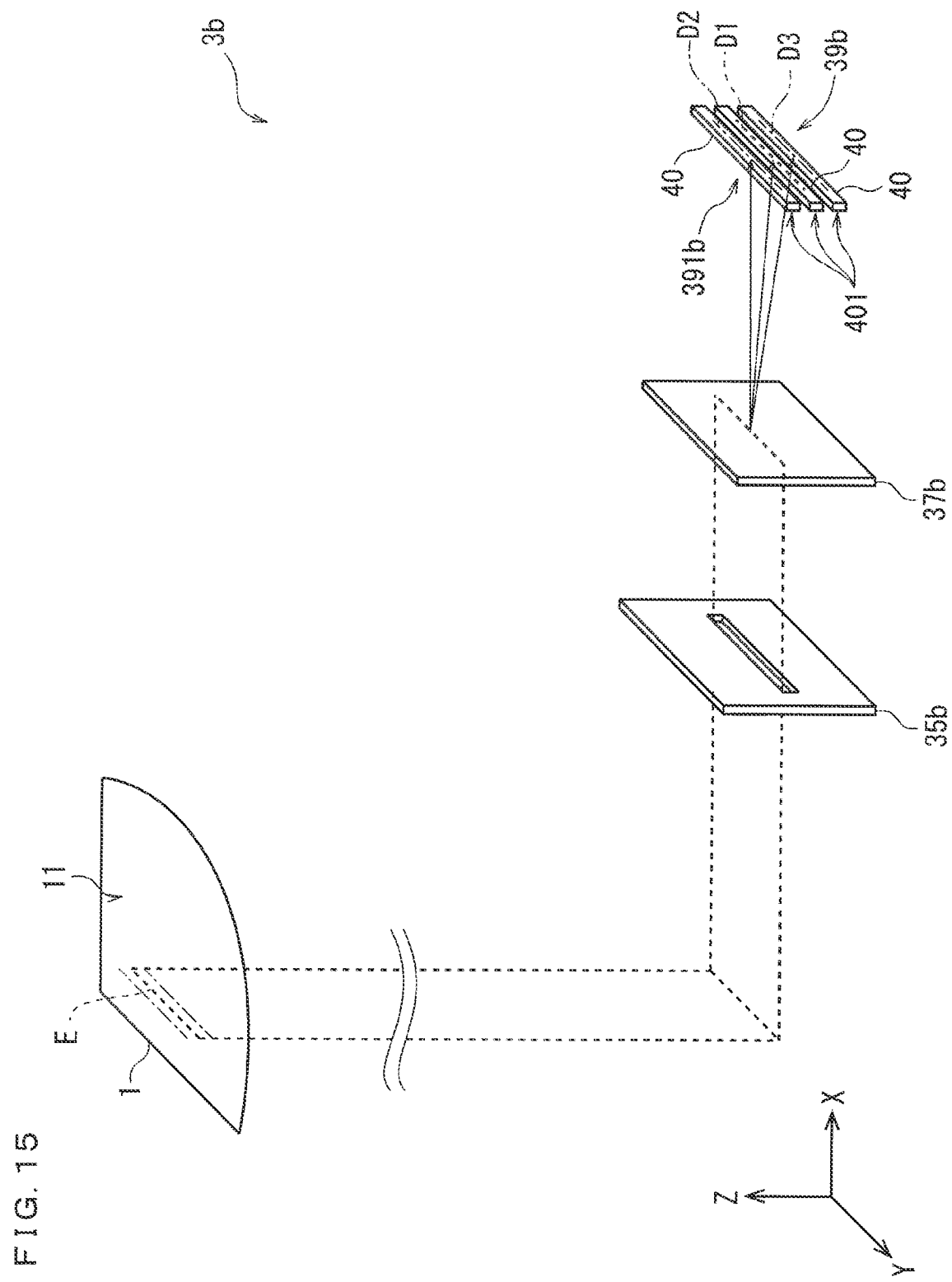
FIG. 15 is a schematic diagram for illustrating an image capturer according to a modification.

An image capturer 3b according to another modification will be described with reference to FIG. 15. FIG. 15 is a diagram for illustrating the image capturer 3b, and schematically illustrates a part of elements (a field stop 35b, a diffractor 37b, and an image capturing member 39b) included in the image capturer 3b.

Similarly to the diffractor 37 according to the above-described embodiment, the diffractor 37b includes a phase modulation diffraction grating that separates incident light into rays of diffracted light of different orders of diffraction with use of a plurality of grooves. In the diffractor 37b, with a pattern of the grooves being appropriately designed, a plurality of rays of diffracted light separated in a predetermined separation direction are generated. Further, similarly to the diffractor 37 according to the above-described embodiment, the diffractor 37b is a multifocal diffractor, and differentiates the focusing positions of the respective separated rays of diffracted light from each other (the focusing positions being shifted by the focusing intervals Δz).

Similarly to the image capturing member 39 according to the above-described embodiment, the image capturing member 39b has a plurality of segment regions Di (i=1, 2 ... ) being defined in the light receiving surface 391b, and each of the plurality of rays of diffracted light generated in the diffractor 37b is received in each segment region Di. Note that, in the image capturing member 39b, a plurality of image capturing members (linear image capturing members)

40 each including a linear light receiving surface (image capturing surface) 401 are arrayed along the separation direction of the diffracted light in the diffractor 37b. Specifically, for example, each linear image capturing member 40b includes what is called a line sensor, in which light receiving elements are arrayed one-dimensionally (in a row). In other words, the light receiving surface 391b of the image capturing member 39b is made up of the plurality of light receiving surfaces 401 arrayed along the separation direction of the diffracted light. Here, each light receiving surface 401 constitutes one segment region Di.

In order that each ray of diffracted light generated in the diffractor 37b be received in each of the plurality of segment regions Di defined in the light receiving surface 391b as described above, here, the following requirements are satisfied. Firstly, the shape and the size of the field stop 35b (or the irradiation region) are determined, in such a manner that the shape and the size of the unit image capturing region E conform to those of the segment region Di. Here, the segment region Di is formed of the linear light receiving surface 401, and thus the unit image capturing region E is a linear region as well. Secondly, an optical positional relationship between the diffractor 37b and the linear image capturing member 40b (the linear image capturing member 40b disposed at the center along the separation direction Q) is determined, in such a manner that the image of the ray of diffracted light of 0 order is formed on a segment region (first segment region) D1 located at the center along the separation direction Q. Thirdly, separation angles between the rays of diffracted light or intervals between adjacent linear image capturing members 40b are determined, in such a manner that the image of the ray of diffracted light of +1 order is formed on a segment region (second segment region) D2 located on one side with respect to the first segment region D1 along the separation direction Q and the image of the ray of diffracted light of −1 order is formed on a segment region (third segment region) D3 located on the other side with respect to the first segment region D1 along the separation direction Q.

Similarly to the image capturer 3 according to the above-described embodiment, in the image capturer 3b as well, each ray of diffracted light is received in each of the plurality of segment regions Di defined in the light receiving surface 391b, and as many unit captured images Pe as the number of the segment regions Di are thereby acquired in a single image capturing. In the example of the drawings, the number of segment regions Di defined in the light receiving surface 391b is three, and accordingly three unit captured images Pe are acquired in a single image capturing. Needless to say, these three unit captured images Pe are a group of captured images capturing the same unit image capturing region E with the focusing positions being different from each other. Thus, while the unit image capturing region E is moved through the entire image capturing cross-section C, for example, and in parallel with this movement, the image capturer 3 performs image capturing a plurality of times at the timing in synchronization with the movement of the unit image capturing region E (here, performs continuous image capturing), and three cross-sectional captured images Pc having the focusing positions being different from each other are thereby acquired.

Note that, in the image capturer 3b according to the present modification, the unit image capturing region E is a linear region. It is preferable that a positional relationship between the stage 1 and the image capturer 3 be set so that an extending direction of the unit image capturing region E matches the secondary scanning direction (Y direction) (that is, so that the unit image capturing region E is an elongated region extending in the secondary scanning direction). As described above, when the unit image capturing region E is set as an elongated region extending in the secondary scanning direction, the number of primary scanning operations necessary for the unit image capturing region E to move through the entire image capturing cross-section C can be reduced.

<8. Third Modification>

Figure 16:
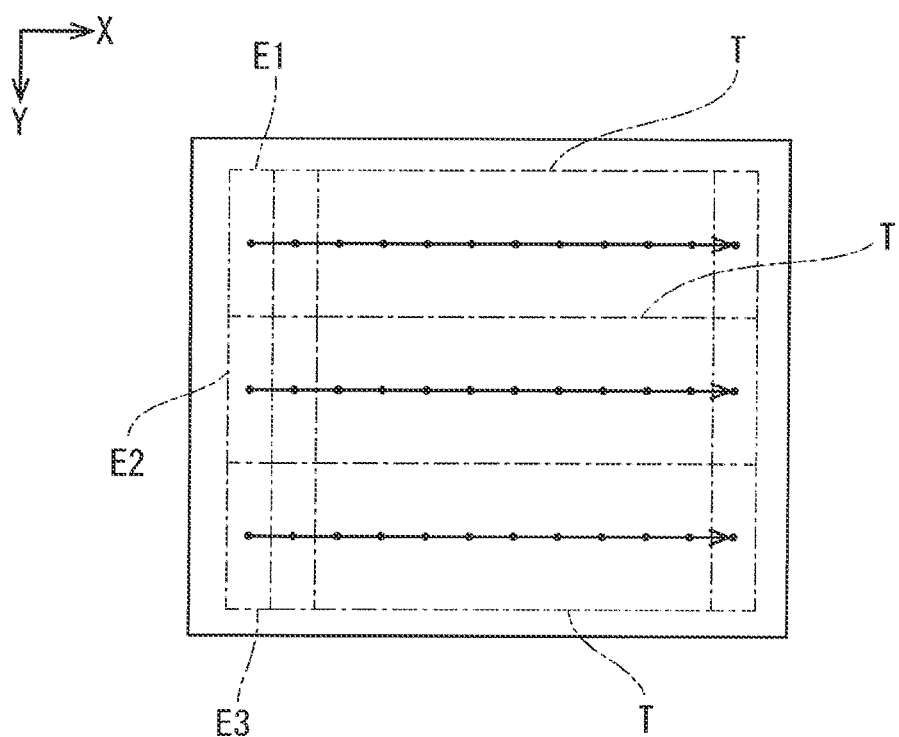
FIG. 16 is a diagram for illustrating an aspect in which unit image capturing regions of each sub-unit are moved in an image capturer according to a modification.

An image capturer according to another modification will be described with reference to FIG. 16. FIG. 16 is a diagram for illustrating an aspect in which unit image capturing regions E1, E2, and E3 of each sub-unit are moved in the image capturer according to a modification.

The image capturer according to the present modification includes a plurality of sub-units (sub image capturers) each including a light source 31, an irradiation optical system K1, an imaging optical system K2, and an image capturing member 39. The components 31 to 39 included in the sub-unit may be the same as those of the components 31 to 39 included in the image capturer 3 according to the above-described embodiment. Further, a part of elements (for example, the light source 31 and the irradiation optical system K1) included in each sub-unit may be shared between the plurality of sub-units.

The plurality of sub-units (three sub-units in the example of the drawings) included in the image capturer according to the present modification are provided such that the unit image capturing regions E1, E2, and E3 each of them is captured by each sub-unit are arrayed along the secondary scanning direction (Y direction).

In the image capturing apparatus including such an image capturer as well, similarly to the image capturing apparatus 100 according to the above-described embodiment, the primary scanning operation with synchronous image capturing is performed. In other words, when the stage drive controller 502 controls the primary scanning mechanism 21 and relatively moves the stage 1 in the primary scanning direction with respect to the image capturer, the unit image capturing regions E1, E2, and E3 each of them is captured by each sub-unit are moved in the primary scanning direction, and in parallel with this movement, the image capturing controller 503 causes each sub-unit to perform image capturing a plurality of times at the timing in synchronization with the movement of each of the unit image capturing regions E1, E2, and E3.

Provided that the number of sub-units included in the image capturer is "J" (J=3 in the example of the drawings), each time a single primary scanning operation with synchronous image capturing is performed, regarding each of the J band-like regions T, N band-like captured images Pt capturing the band-like region T with the focusing positions being different from each other (the focusing positions being shifted by the focusing intervals Δz) are acquired by the J sub-units. Thus, according to such a configuration, the number of primary scanning operations to be performed in a single planar scanning operation needs to be merely I/J of a necessary number of band-like captured images Pt, and processing time required for the planar scanning operations can be significantly reduced.

<9. Other Modifications>

As described above, in the image capturer 3, each ray of diffracted light generated in the diffractor 37 is received in each of a plurality of (N) segment regions Di defined in the light receiving surface 391, and N unit captured images Pe are thereby acquired. In such a configuration, intensity of light received in each segment region Di is reduced to approximately 1/N of intensity of the illumination light radiated onto the unit image capturing region E. Accordingly, in order that light of sufficient intensity be received in each segment region Di, it is preferable that the intensity of the illumination light radiated from the light source 31 onto the unit image capturing region E be sufficiently high, or that shutter speed (time during which a shutter is open, that is, exposure time) of the image capturing member 39 be sufficiently prolonged.

Note that, in order to sufficiently avoid occurrence of blurring and the like in the captured image, it is preferable that the shutter speed be sufficiently short, with respect to the intervals $\Delta T$ at which the image capturer 3 performs synchronous image capturing. It is preferable that the moving velocity V of the stage 1 be sufficiently increased in order to reduce time required for the planar scanning operation; however, an increased moving velocity V means reduced intervals $\Delta T$, which further means that allowable shutter speed becomes shorter. Thus, depending on a required moving velocity V, it is preferable that the intensity of light received in each segment region Di be secured not by prolonging the shutter speed but by increasing the intensity of the illumination light. In order to increase the intensity of the illumination light, specifically, for example, the following measures may be adopted. The measures include providing a high-output light source 31, implementing an optical system that concentrates the illumination light radiated from the light source 31 on the unit image capturing region E in the irradiation optical system K1, or (and) the like.

In the above-described embodiment, the unit image capturing region E is an elongated region, and its extending direction matches the secondary scanning direction. However, the direction of the unit image capturing region E is not limited thereto. For example, the extending direction of the unit image capturing region E being an elongated region may match the primary scanning direction. In other words, the positional relationship between the stage 1 and the image capturer 3 may be set so that the long side of the unit image capturing region E corresponding to the long side (side that is not divided into (1/N) in the light receiving surface 391) of the segment region Di extends along the primary scanning direction, and the short side of the unit image capturing region E corresponding to the short side (side that is divided into (1/N) in the light receiving surface 391) of the segment region Di extends along the secondary scanning direction. According to the configuration, the intervals $\Delta T$ (=Ex/V) at which the image capturer 3 performs synchronous image capturing have a large value, as compared to a case in which the extending direction of the unit image capturing region E matches the secondary scanning direction. As a result, allowable shutter speed is prolonged. Accordingly, for example, even when it is difficult to increase the intensity of the illumination light radiated onto the unit image capturing region E (for example, when a sample susceptible to light is used as the object 9), it can be ensured that light of sufficient intensity be received in each segment region Di.

In the above-described embodiment, the number of segment regions Di defined in the light receiving surface 391 may be any number. For example, the light receiving surface 391 may be segmented with dividing lines parallel with each other, and five or more segment regions Di may thereby be defined. Alternatively, for example, the light receiving surface 391 may be segmented with grid-like dividing lines, and 25 or more segment regions Di may thereby be defined.

As the number of segment regions Di defined in the light receiving surface 391 is large, the number of unit captured images Pe acquired in a single image capturing (or the number of cross-sectional captured images Pc acquired each time a single planar scanning operation is performed) becomes large. With the same area of the light receiving surface 391, however, as the number of segment regions Di is large, the area of each segment region Di becomes small, and accordingly the area of the unit image capturing region E becomes small. This, as a result, increases the number of unit captured images Pe to be connected together to acquire the cross-sectional captured image Pc. Further, as the length Ey of the unit image capturing region E along the secondary scanning direction is reduced, the number of primary scanning operations necessary in a single planar scanning operation is increased. Further, as the length Ex of the unit image capturing region E along the primary scanning direction is reduced, the intervals $\Delta T$ of synchronous image capturing (or allowable shutter speed) is reduced, and accordingly the intensity of the illumination light to be radiated onto the unit image capturing region E is increased. The number of segment regions Di may be determined as appropriate in view of the balance among these. As an example, it is preferable that the number of segment regions Di be from three to five.

In the above-described embodiment, the diffractor 37 includes the diffraction grating that separates incident light into rays of light of different orders of diffraction with use of the large number of grooves 371. However, the configuration of the diffractor 37 is not limited thereto. For example, the diffractor 37 may include an amplitude modulation diffraction grating (what is called an amplitude grating) that separates incident light into rays of light of different orders of diffraction, with transparent parts and light blocking parts being repeatedly provided. Further, for example, the diffractor 37 may include a spatial light modulator (SLM), which is a device that changes (modulates) distribution (at least one of amplitude, phase, and polarization) of incident light with use of electrical control. More specifically, the diffractor 37 may include a Grating Light Valve (GLV) (trademark), a planar light valve (PLV), a digital micromirror device (DMD), or the like.

In the above-described embodiment, the stage driving part 2 moves the stage 1 within a plane in parallel with the placement surface 11 of the stage 1 to relatively move the stage 1 and the image capturer 3, so as to move the unit image capturing region E. However, the configuration of moving the unit image capturing region E is not limited thereto. For example, the image capturer 3 (at least a part of the elements included in the image capturer 3) may be moved within a plane in parallel with the placement surface 11, so as to move the unit image capturing region E. Alternatively, for example, both of the stage 1 and the image capturer 3 may be moved, so as to move the unit image capturing region E.

Further, in the above-described embodiment, the lens driving part 4 moves the objective lens 33 in the optical axis direction (height direction) to relatively move the stage 1 and the objective lens 33, so as to move the focal position when the image capturer 3 performs image capturing. However, the configuration of moving the focal position is not limited thereto. For example, the stage 1 may be moved in the height direction, so as to move the focal position. Alternatively, for example, both of the stage 1 and the objective lens 33 may be moved, so as to move the focal position.

In the above-described embodiment, specific configurations of the image capturer 3 may be changed as appropriate. For example, in the image capturer 3 according to the above-described embodiment, the image capturing member 39 detects light that has transmitted through the object 9 placed on the stage 1. However, for example, the image capturing member 39 may be provided on the same side as the side on which the light source 31 is located with respect to the stage 1, and may detect light reflected or scattered on the object 9 placed on the stage 1.

In the above-described embodiment, in the planar scanning operation, a plurality of times of the primary scanning operation with synchronous image capturing is performed with the secondary scanning operation being inserted between each of the plurality of times of the primary scanning operation. However, the primary scanning operation with synchronous image capturing need not necessarily be performed a plurality of times. For example, when the unit image capturing region E is moved through the entire image capturing cross-section C in a single primary scanning operation, the number of times to execute the primary scanning operation with synchronous image capturing may be one.

In the above-described embodiment, a plurality of times of the planar scanning operation is performed with the movement of the objective lens 33 being inserted between each of the plurality of times of the planar scanning operation. However, the planar scanning operation need not necessarily be performed a plurality of times. For example, when a plurality of cross-sectional captured images Pc over the entire height direction of the image capturing region R are acquired in a single planar scanning operation, the number of times to execute the planar scanning operation may be one.

In the above-described embodiment, in the plurality of cross-sectional captured images Pc acquired in the plurality of times of the planar scanning operation, the intervals of their respective focusing positions need not necessarily be regular. In other words, a movement width of the objective lens 33 moved between each of the plurality of times of the planar scanning operation need not necessarily be the unit width Ez. Further, the movement width need not be regular.

In the above-described embodiment, the object 9 captured by the image capturing apparatus 100 may be any object, and may be an electronic component, for example. In other words, the image capturing apparatus 100 may be used for observation, examination, or the like of an electronic component. Further, in the above-described embodiment, the plurality of cross-sectional captured images Pc acquired in the image capturing apparatus 100 may be used in any manner. For example, the plurality of cross-sectional captured images Pc may be used to generate a phase image. Specifically, for example, with use of a cross-sectional captured image Pc on an observation plane and a pair of cross-sectional captured images Pc whose focusing positions are symmetrically shifted with respect to the observation plane, a phase image on the observation plane may be generated using a solution to the transport-of-intensity equation. Alternatively, for example, based on a plurality of cross-sectional captured images Pc, an image including a plurality of focal positions (what is called an all-in-focus image) may be generated While the image capturing apparatus 100 and the image capturing method have been shown and described in detail as above, the foregoing description is in all aspects illustrative and not restrictive. It is therefore understood that numerous unillustrated modifications and variations can be devised without departing from the scope of the disclosure. Further, each configuration described in the above-described embodiment and each modification can be combined or omitted as appropriate as long as there is consistency.

What is claimed is:

1. An image capturing apparatus comprising:
   a stage on which an object is placed;
   an image capturer; and
   a controller that relatively moves the stage within a predetermined plane with respect to the image capturer to move a unit image capturing region captured in the image capturer, and simultaneously causes the image capturer to perform image capturing a plurality of times, wherein
   the image capturer includes
      a light source that emits illumination light,
      an objective lens having an optical axis in a direction intersecting the predetermined plane,
      a multifocal diffractor that generates a plurality of rays of diffracted light including a ray of diffracted light of 0 order from incident light entering through the objective lens, the plurality of rays of diffracted light having focusing positions being different from each other, and
      an image capturing member that receives each of the plurality of rays of diffracted light in each of a plurality of segment regions defined in a light receiving surface,
   an image of the unit image capturing region is formed on each of the plurality of segment regions in the image capturing member through each of the plurality of rays of diffracted light of different orders to acquire a plurality of unit captured images of the same unit image capturing region with the focusing positions of the plurality of rays of diffracted light being different from each other, and
   each of the plurality of segment regions is an elongated region extending in a direction perpendicular to a separation direction of the plurality of rays of diffracted light.

2. The image capturing apparatus according to claim 1, wherein
   the controller alternately performs a primary scanning operation of moving the unit image capturing region in a primary scanning direction and a secondary scanning operation of moving the unit image capturing region in a secondary scanning direction intersecting the primary scanning direction to move the unit image capturing region in an entire predetermined region, and causes the image capturer to perform the image capturing of the plurality of times in parallel with the primary scanning operation, and
   the unit image capturing region is an elongated region extending in the secondary scanning direction.

3. The image capturing apparatus according to claim 1, wherein
   the light receiving surface is segmented with dividing lines in parallel with each other, and the plurality of segment regions are thereby defined.

4. The image capturing apparatus according to claim 1, wherein
   the light receiving surface is segmented with grid-like dividing lines, and the plurality of segment regions are thereby defined.

5. The image capturing apparatus according to claim 1, wherein
   the controller performs a plurality of times of an operation of moving the unit image capturing region in an entire predetermined region and simultaneously causing the image capturer to perform the image capturing of the plurality of times, with an operation of relatively moving the objective lens along the optical axis with respect to the stage being inserted between each of the plurality of times of the operation.

6. An image capturing method comprising
a repeated image capturing step of relatively moving a stage on which an object is placed within a predetermined plane with respect to an image capturer to move a unit image capturing region captured in the image capturer, and simultaneously causing the image capturer to perform image capturing a plurality of times, wherein
in each of the image capturing of the plurality of times performed in the image capturer, illumination light is emitted from a light source, a plurality of rays of diffracted light including a ray of diffracted light of 0 order are generated from incident light entering a multifocal diffractor through an objective lens having an optical axis in a direction intersecting the predetermined plane, the plurality of rays of diffracted light having focusing positions being different from each other, and each of the plurality of rays of diffracted light is received in each of a plurality of segment regions defined in a light receiving surface of an image capturing member, wherein
an image of the unit image capturing region is formed on each of the plurality of segment regions in the image capturing member through each of the plurality of rays of diffracted light of different orders to acquire a plurality of unit captured images of the same unit image capturing region with the focusing positions of the plurality of rays of diffracted light being different from each other, and
each of the plurality of segment regions is an elongated region extending in a direction perpendicular to a separation direction of the plurality of rays of diffracted light.

* * * * *